US008633969B2

(12) United States Patent
Silveira et al.

(10) Patent No.: US 8,633,969 B2
(45) Date of Patent: Jan. 21, 2014

(54) APPARATUS AND METHOD FOR THREE-DIMENSIONAL IMAGE CAPTURE WITH EXTENDED DEPTH OF FIELD

(75) Inventors: Paulo E. X. Silveira, Boulder, CO (US); Dennis J. Gallagher, Boulder, CO (US); Lu Gao, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 347 days.

(21) Appl. No.: 13/024,221

(22) Filed: Feb. 9, 2011

(65) Prior Publication Data

US 2012/0200671 A1  Aug. 9, 2012

(51) Int. Cl.
*H04N 13/02* (2006.01)
(52) U.S. Cl.
USPC ............................................. 348/46
(58) Field of Classification Search
USPC ............................................. 348/46
See application file for complete search history.

(56) References Cited

U.S. PATENT DOCUMENTS

| 5,748,371 | A | 5/1998 | Cathey, Jr. et al. |
| 6,069,738 | A | 5/2000 | Cathey, Jr. et al. |
| 6,525,302 | B2 | 2/2003 | Dowski, Jr. et al. |
| 7,710,658 | B2 * | 5/2010 | Dowski et al. ................. 359/679 |
| 2004/0189942 | A1 * | 9/2004 | Yoon ............................ 351/221 |
| 2008/0234984 | A1 | 9/2008 | Ortyn et al. |
| 2010/0008588 | A1 * | 1/2010 | Feldkhun et al. ............. 382/206 |
| 2010/0238327 | A1 | 9/2010 | Griffith et al. |
| 2010/0275178 | A1 * | 10/2010 | Wei ................................ 716/56 |
| 2011/0017902 | A1 | 1/2011 | Hing et al. |
| 2011/0074988 | A1 * | 3/2011 | Robinson et al. ............. 348/273 |
| 2012/0074294 | A1 * | 3/2012 | Streuber et al. ............ 250/201.9 |

FOREIGN PATENT DOCUMENTS

WO   WO 2008/008084   1/2008

OTHER PUBLICATIONS

European Search Report issued in related European Patent Application 12154760.8, dated Jun. 6, 2012, 8 pages.
Response to Correct Deficiencies noted in European Search Report filed in related European Patent Application 12154760.8, dated Jan. 30, 2013, 65 pages.

* cited by examiner

*Primary Examiner* — David Czekaj
*Assistant Examiner* — Tracy Li
(74) *Attorney, Agent, or Firm* — Lathrop & Gage LLP

(57) ABSTRACT

An optical system for capturing three-dimensional images of a three-dimensional object is provided. The optical system includes a projector for structured illumination of the object. The projector includes a light source, a grid mask positioned between the light source and the object for structured illumination of the object, and a first Wavefront Coding (WFC) element having a phase modulating mask positioned between the grid mask and the object to receive patterned light from the light source through the grid mask. The first WFC element is constructed and arranged such that a point spread function of the projector is substantially invariant over a wider range of depth of field of the grid mask than a point spread function of the projector without the first WFC element.

10 Claims, 34 Drawing Sheets

FIG. 1 – PRIOR ART

APPARATUS AND METHOD FOR THREE-DIMENSIONAL IMAGE CAPTURE WITH EXTENDED DEPTH OF FIELD

CROSS-REFERENCE TO RELATED APPLICATIONS

U.S. Pat. No. 5,748,371, issued May 5, 1998 and entitled "Extended Depth of Field Optical Systems," is incorporated herein by reference. U.S. Pat. No. 6,069,738, issued on May 30, 2000, and entitled "Apparatus and Methods for Extending Depth of Field in Image Projection Systems," is incorporated herein by reference. U.S. Pat. No. 6,525,302, issued on Feb. 25, 2003, and entitled "Wavefront Coding Phase Contrast Imaging Systems," is incorporated herein by reference. International Patent Application PCT/US2006/036556, filed Sep. 19, 2006 and entitled "Task-Based Imaging Systems", is incorporated herein by reference.

BACKGROUND

Structured illumination (SI) or patterned illumination projects a narrow band of light onto a three-dimensional scene to produce lines of illumination that appear distorted. The distortions can be imaged and used to reconstruct the surface shape of one or more objects within the scene, by triangulation of the position of the distorted lines.

Patterns of parallel stripes are widely used in structured illumination. Two common methods for stripe pattern generation are laser interference and projection. The laser interference method uses two laser beams which interfere to generate regular line patterns. Different pattern sizes can be obtained by changing the angle between these beams. This method generates fine patterns with unlimited depth of field. However, the laser interference technique has disadvantages including high cost associated with implementation, incapability of modulating individual stripes, and possible interference with beams reflected from objects.

The projection method, on the other hand, uses a projector with an incoherent light source for generating patterned light (e.g. a video projector). Patterns may be generated by a display within the projector, such as a liquid crystal (LCD) display.

There still remains a need for developing systems and methods for capturing three-dimensional images with high resolution and low cost. Furthermore, there is a need for a robust method to detect the projected lines over a wide depth of field (DOF).

SUMMARY

This disclosure advances the art by providing a three-dimensional image capture system with extended depth of field. The three-dimensional image capture system incorporates Wavefront Coding (WFC) elements to extend the depth of field.

In an embodiment, an optical system for capturing three-dimensional images of a three-dimensional object is provided. The optical system includes a projector for structured illumination of the object. The projector includes a light source, a grid mask positioned between the light source and the object for structured illumination of the object, and a first Wavefront Coding (WFC) element having a phase modulating mask positioned between the grid mask and the object to receive patterned light from the light source through the grid mask. The first WFC element is constructed and arranged such that a point spread function of the projector is substantially invariant over a wider range of depth of field of the grid mask than a point spread function of the projector without the first WFC element.

In another embodiment, a folded optical system for capturing images of a three-dimensional object is provided. The optical system includes a projector for structured illumination of the object. The projector comprises includes a light source, a grid mask positioned between the light source and the object for structured illumination of the object, a first Wavefront Coding (WFC) element having a phase modulating mask positioned between the grid mask and the object, and a beam splitter between the first WFC element and the object for changing a light direction from the light source. The first WFC element is constructed and arranged such that a point spread function of the projector is less sensitive to a depth of field of the grid mask than a point spread function of the projector without the first WFC element.

In a further embodiment, an optical system for capturing images of a three-dimensional object is provided. The optical system comprising a projector for structured illumination of the object. The projector includes a light source, a physical medium embossed to have a surface relief pattern according to a computer generated hologram (CGH). The physical medium is positioned between the light source and the object for structured illumination of the object. The CGH includes a first computer representation of a grid mask and a second computer representation of a first Wavefront Coding (WFC) element. The optical system also includes a beam splitter between the physical medium and the object for changing a light direction from the light source. The physical medium is constructed and arranged such that a point spread function of the projector is less sensitive to a depth of field of the physical medium than a point spread function of the projector without the physical medium.

In an embodiment, a method for capturing an image of a three-dimensional object is provided. The method includes (1) projecting light from a projector through a grid mask and a phase modulating mask to generate patterned light; (2) illuminating the three-dimensional object with the patterned light; and (3) capturing at a detector patterned light reflected by the three-dimensional object.

In an embodiment, a method for capturing an image of a three-dimensional object is provided. The method includes projecting patterned light from a projector toward the three-dimensional object, where the projector includes a light source and a physical medium embossed to have a surface relief pattern according to a computer generated hologram (CGH), the physical medium is positioned between the light source and the object for structured illumination of the object. The CGH includes a first computer representation of a grid mask and a second computer representation of a first Wavefront Coding (WFC) element. The method also includes illuminating the patterned light onto the three-dimensional object. The method further includes capturing images of the three-dimensional object at a detector, wherein the physical medium is constructed and arranged such that a first point spread function of the projector is less sensitive to a depth of field of the physical medium than a point spread function of the projector without the physical medium.

Additional embodiments and features are set forth in the description that follows, and will become apparent to those skilled in the art upon examination of the specification or may be learned by the practice of the invention. A further understanding of the nature and advantages of the present invention may be realized by reference to the remaining portions of the specification.

DETAILED DESCRIPTION

Figure 1:
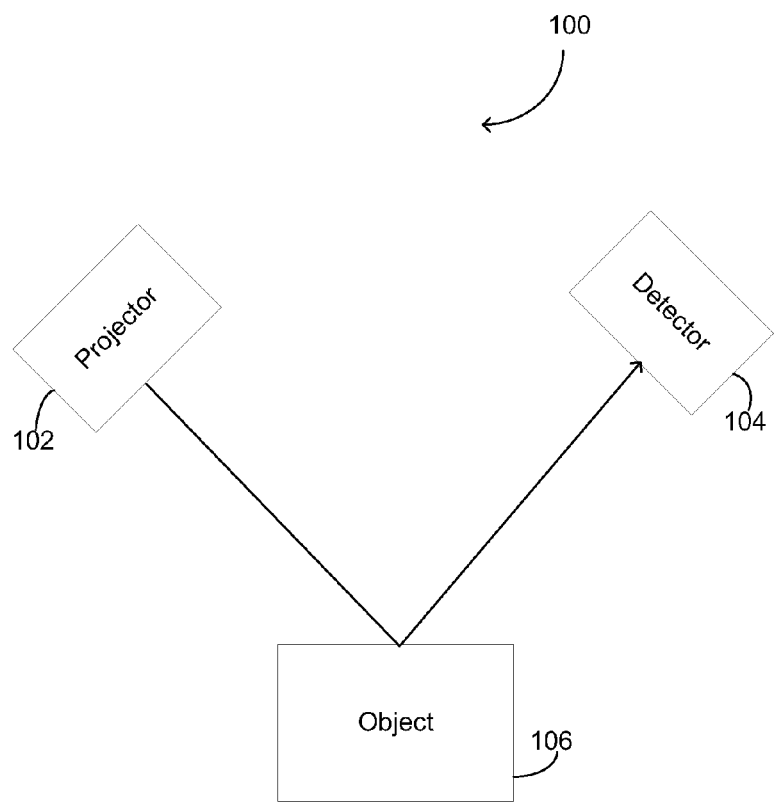
FIG. 1 is a simplified diagram of a conventional optical system for structured illumination of an object.

The present disclosure may be understood by reference to the following detailed description considered in conjunction with the drawings. Note that, for purposes of illustrative clarity, certain elements in the drawings are not drawn to scale. Reference numbers for items that appear multiple times may be omitted for clarity. Where possible, the same reference numbers are used throughout the drawings and the following description to refer to the same or similar parts.

Structured illumination may project patterned light through a grid onto an object to capture surface slopes of the object by measuring surface distortion of the grid. This structured illumination technique requires projecting and detecting fine lines of the grid over a capture volume of the SI system. Thus, the capture volume of a conventional SI system is limited by the system's depth of field such that it is difficult to accurately project and/or detect the grid lines and their crossing points over a large capture volume.

Wavefront Coding ("WFC") is a method for extending the depth of field of an optical system and for correcting optical aberration. WFC utilizes, for example, specially designed phase masks to produce a point spread function with an extended depth of field or focus ("EdoF" or "EDOF"). The point spread function ("PSF") describes the response of an imaging system to a point source or point object. WFC may use, for example, a cubic phase mask that blurs an image uniformly. A digital image processor may then remove the blur (e.g., when a viewable image is desired). However, dynamic range may be sacrificed to extend the depth of field. That is, a modulation transfer function (which can be thought of as a measure of contrast) of the imaging system may be low at certain spatial frequencies in the as-detected image data. The modulation transfer function can be increased with image processing, but amplifying a low-contrast signal generally also amplifies noise at the same spatial frequency.

The present disclosure provides systems and methods that integrate imaging systems with WFC to extend a depth of field to capture 3D images at low cost. More specifically, the systems use a first WFC element to project, and an optional second WFC element to detect, grids of structured illumination over an extended depth of field. The WFC elements may also reduce chromatic aberration for color encoded structured illumination.

FIG. 1 is a simplified diagram of a conventional optical system 100 for structured illumination of an object. Conventional optical system 100 may include a projector 102 and a detector 104 (e.g., a camera) for viewing object 106. Projector 102 includes a light source for emitting light toward object 106. Detector 104 receives scattered or diffracted light from object 106.

Figure 2:
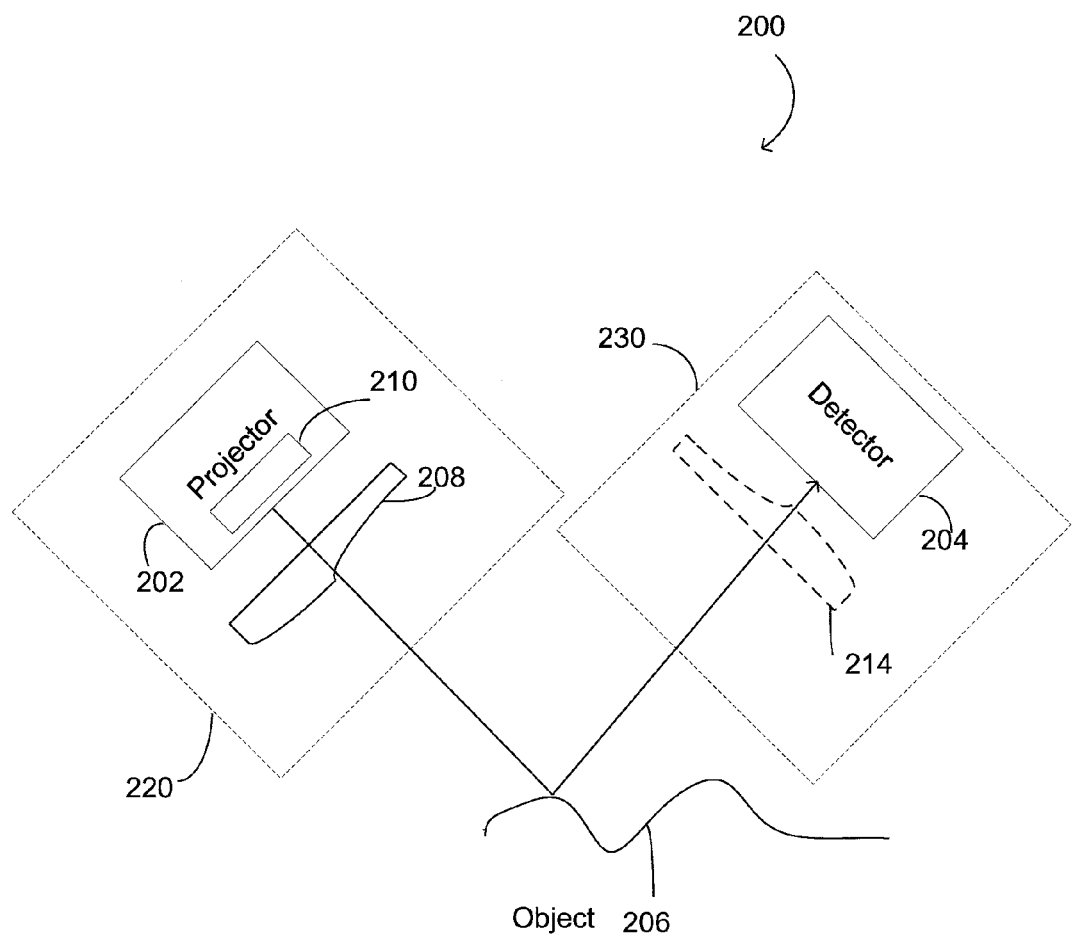
FIG. 2 is a simplified diagram of an optical system with extended depth of field in an embodiment.

FIG. 2 is a simplified diagram of an optical system 200 with extended depth of field. System 200 includes a projection arm 220 that has a projector 202 with a first WFC element 208, and a detection arm 230 that has a detector 204 (e.g. a camera) with an optional, second WFC element 214. Light from projector 202 passes through first WFC element 208 and impinges on object 206. Light scatters or diffracts from object 206 toward detector 204 through second WFC element 214. Projector 202 may include a grid mask 210 for structured illumination.

First WFC element 208 provides phase modulations for grid 210 such that grid 210 appears to be less sharp in system 200 than in conventional system 100 at best-focus. However, the incorporation of first WFC element 208 into system 200 allows grid 210 of projector 202 to be detected over a wider range of depth of field, such that centroids of grid 210 may be accurately determined over the wider range of depth of field. Although system 200 has extended depth of field, a signal-to-noise ratio (SNR) may be reduced in system 200 at best focus as a result of incorporation of first WFC element 208.

The optional, second WFC element 214 is integrated into system 200 for compensation of lateral shifts introduced by first WFC element 208. However, second WFC element 214 may blur the image. Second WFC element 214 may be movable or removable and used only when needed for compensating lateral shifts. The first and second WFC elements are discussed further below.

A limitation of system 200 is that object 206 should not, but might, block illumination from projector 202. In system 200, projector 202 and detector 204 are not aligned. A projector and a detector may advantageously be aligned such that light from the projector impinges on an object and the light scatters back toward the detector in the same direction as the incoming direction of the light as detectable by the system. The advantage of the aligned projector and detector is that all surfaces that are illuminated by the projection optics are "visible" to the receiving optics, and vice versa. Some objects may be behind other objects, but at least all the objects "visible" to the receiving optics will be illuminated. An example is provided for such a system that has a projector aligned with a detector.

Figure 3:
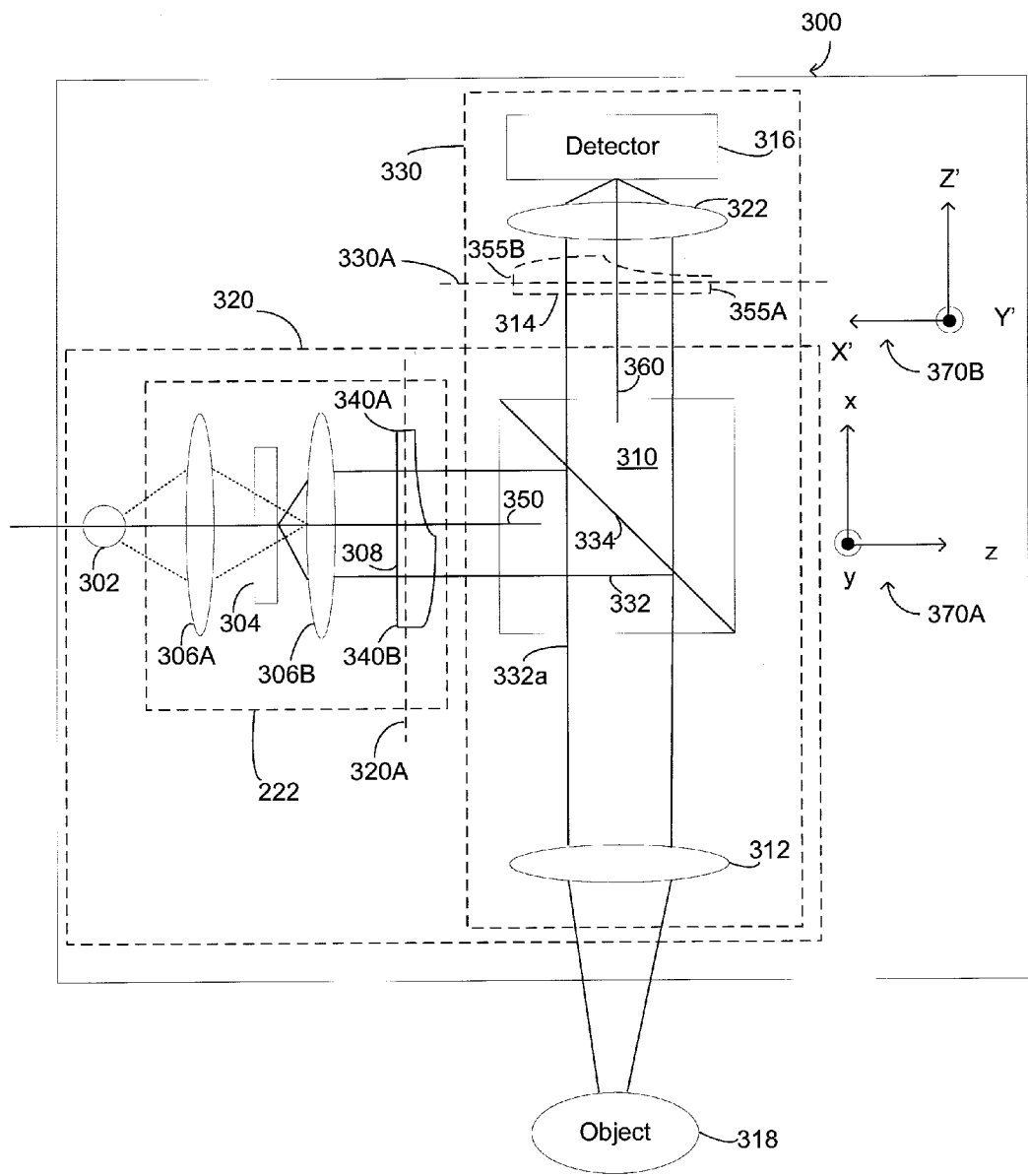
FIG. 3 is a folded optical system with extended depth of field in an embodiment.

FIG. 3 is a folded optical system 300 with extended depth of field. Folded optical system 300 includes an illumination arm or a projection arm 320 and a detection arm 330, bounded by dashed lines. The projection arm 320 may include a light source 302, a grid mask 304, a collimating lens 306A, a first WFC element 308, lens 306B, a dual-use folding beam splitter 310, and a dual-purpose lens 312. The detection arm 330 includes lens 312, beam splitter 310, an optional second WFC element 314, lens 322, and a detector 316. Beam splitter 310 and lens 312 are used in both projection arm 320 and detector arm 330 for a dual-purpose.

In projection arm 320, light from light source 302 is condensed through collimating lens 306A which may be at approximately one focal length from light source 302. Collimating lens 306A provides uniform illumination for grid mask 304. Lens 306B may be placed approximately one focal length from grid mask 304 and Fourier transforms an image of grid mask 304. A Fourier plane is a plane in space perpendicular to the optic axis where an image is Fourier transformed by a lens. For an image of one focal length before the lens, its Fourier transform is found one focal length after the lens. First WFC element 308 is positioned between lens 306B and beam splitter 310 and near a Fourier plane 320A of projection arm 320, such that grid mask 304 remains well-focused over a larger distance than without use of first WFC element 308. Fourier plane 320A is approximately one focal length from lens 312 and one focal length from lens 306B. Lens 312 is a dual purpose lens, which operates as a projection lens for the projection arm 320 and as a Fourier-transform lens for the detection arm 330. First WFC element 308 in projection arm 320 makes grid mask 304 appear to be less sharp than a grid mask of conventional optical system 100 at best focus. Therefore, the signal-to-noise ratio of system 300 may be lower than that of conventional optical system 100 at best focus. However, system 300 allows grid mask 304 to be detected over an extended depth of field such that centroids of grid mask 304 may be accurately determined over the extended depth of field.

Light source 302 may emit visible light or invisible light. For example, infrared light may be used when a user of system 300 does not want object 318 (e.g. human or animal) to be aware of image capture. In an alternative embodiment, one or more of grid mask 304, collimating lens 306, and first WFC element 308 may be combined or integrated into a single element 222 (bounded by dotted lines), resulting in reduced part count and alignment steps required by system 300 and potentially reducing fabrication costs and increasing the quality and performance of the system. Grid mask 304 may be movable or removable such that projection arm 320 may be used for illuminating object 318 thereby enabling system 300 to capture simple images of object 318 as a camera would.

Beam splitter 310 allows system 300 to be folded by changing light direction from projector arm 320 so that it shares an optical path with light received by detector 316. Beam splitter 310 partially reflects an incoming beam 332 from light source 302 toward object 318. More specifically, beam 332 impinges at about 45 degrees on surface 334 of beam splitter 310, which at least partially reflects beam 332 from surface 334 to form beam 332a toward object 318. Beam 332a impinges on object 318 and scatters back and transmits through beam splitter 310, and may pass through optional second WFC element 314, and forms an image of illuminated object 318 on detector 316. Beam splitter 310 may also be movable or removable to allow low-light or low-illumination operation of system 300 when no illumination from projection arm 320 is necessary. A reflection surface 334 of beam splitter 310 may be, for example, a half-silvered mirror. Surface 334 may be made of a plate of glass with a thin metallic coating (e.g. aluminum) or a dielectric coating. Reflection to transmission ratios of surface 334 may vary with materials and wavelength.

In detection arm 330, lens 322 operates as an eyepiece lens, forming an image onto detector 316. Lens 322 is placed approximately one focal length from detector 316. Beam splitter 310 transmits light from object 318 to detector 316. Second WFC element 314 may be optionally included, to provide extended depth of field for imaging of object 318, and/or to compensate for lateral shifts generated by first WFC element 308.

In an embodiment, first WFC element 208 or 308 may include high-order separable (HOS) elements and high-order nearly separable (HONS) elements or weakly non-separable elements. The HOS and/or HONS elements have the benefit of concentrating their modulation in the horizontal and vertical directions (the directions along which most of the grid images are oriented). However, the HOS and/or HONS elements may also introduce a lateral shift of the point spread function (PSF) as a function of defocus, which means that points of three-dimensional object 318 at various depths have different lateral shifts in the image plane of detector arm 330.

Second WFC element 314 may be placed near a Fourier plane 330A of detection arm 330 to increase the DOF not only of the captured images of object 318 but also of the captured images of projected grid mask 304. Fourier plane 330A is approximately one focal length from lens 322 and approximately one focal length away from lens 312. Second WFC element 314 may be the same type as first WFC element 208 or 308, but rotated so as to compensate or correct the lateral shifts caused by first WFC element 308, as now explained.

Assuming beam splitter 310 is used, to combine both projection and detection arms 320 and 330 into one system 300, and beam splitter includes reflection surface 334 at a forty-five degree angle, there will be a rotation of 90 degrees between an optical axis 350 of projection arm 320, including first WFC element 308, and an optical axis 360 of detection arm 330, including second WFC element 314. For example, optical axis 350 of projection aim 320 is substantially perpendicular to optical axis 360 of detector arm 330. First WFC element 308 may have a phase profile in x and y coordinates and optical axis 350 along the z axis direction, according to coordinate system 370A shown in FIG. 3. Second WFC element 314 has a phase profile in X' and Y' coordinates, and optical axis 360 along Z' axis, according to coordinate system 370B shown in FIG. 3.

As illustrated in FIG. 3, the Y' axis of second WFC element 314 is in the same direction as the y axis of first WFC element 308. The Z' axis of second WFC element 314 rotates counter clockwise around the y axis of first WFC element 308 for 90 degrees such that the Z' axis of second WFC element 314 is in the same direction as that of the x axis of first WFC element 308. The X' axis of second WFC element 314 is opposite to the z axis of first WFC element 308 such that lateral shifts generated by first WFC element 308 may be compensated by second WFC element 314. First WFC element 308 has two ends 340A and 340B, where end 340A is at a more positive x coordinate than end 340B. For the orientation of second WFC element 314 relative to first WFC element 308, one may imagine that second WFC element 314 may rotate counter-clockwise by 90 degrees about the y axis of first WFC element 308 from end 340A of first WFC element 308. After the 90 degrees rotation, second WFC element 314 flips 180 degrees around the Y' axis of second WFC element 314. One end 355B of second WFC element 314 is at a more positive X' coordinate than a second end 355A of second WFC element 314 after the rotation. Ends 355A and 355B of second WFC elements correspond to ends 340A and 340B respectively. This way all points between grid mask 304 and detector 316 experience approximately the same amount of phase modulation through first and second WFC elements 308 and 314, thus compensating for any lateral shift introduced by first WFC element 308 as a function of defocus.

By using a cubic or a HOS function in first WFC element 208 or 308, most modulations are concentrated in the x and y directions where grid lines are undistorted, for example, 60%, 80%, 90% or higher. In other words, first WFC element 208 or 308 is configured to concentrate most phase modulations along grid lines (e.g. grid lines 702, 802 and 902 of FIGS. 7-9).

In an embodiment, the first and second WFC elements may include a weakly non-separable function. The weakly non-separable function of the first WFC element may be expressed as:

$$P(x, y) = \sum_i^N \sum_j^N \alpha_i x^i + \beta_j y^j + \gamma x^i y^j \quad \text{Equation (1)}$$

where i and j are positive integers starting from 1, and N is the highest polynomial order. In practice, N is usually limited to about 5, since the effect of higher order terms are usually lost due to the practical limits of fabrication tolerances. The weakly non-separable function of second WFC element 314 may be expressed as:

$$P(X', Y') = \sum_i^N \sum_j^N \alpha_i (-X')^i + \beta_j (-Y')^j + \gamma (-X')^i (-Y')^j \quad \text{Equation (2)}$$

where i and j are positive integers starting from 1, and where the minus signs represent the 180 degrees rotation about optic axis 360 of second WFC element 314, as previously described. Coefficients α and β may or may not be equal. When coefficient γ is equal to zero, the weakly non-separable function becomes a high order separable function. First WFC element 308 may include a high order separable function expressed as:

$$P(x, y) = \sum_i^N \sum_j^N \alpha_i x^i + \beta_j y^j \quad \text{Equation (3)}$$

Second WFC element 314 may include a high order separable function expressed as:

$$P(X', Y') = \sum_i^N \sum_j^N \alpha_i (-X')^i + \beta_j (-Y')^j \quad \text{Equation (4)}$$

In a particular embodiment, the high order separable function of first WFC element 308 may be a cubic function expressed as:

$$P(x,y) = \alpha x^3 + \beta y^3 \quad \text{Equation (5)}$$

The cubic function of second WFC element 314 is expressed as:

$$P(x,y) = -\alpha X^3 + \beta Y^3) \quad \text{Equation (6)}$$

Coefficients α and β may or may not be equal.

In an alternative embodiment, second WFC element 214 or 314 may be different from first WFC element 214 or 314. For example, second WFC element 214 or 314 may have a circularly symmetric function. The circularly symmetric function does not compensate for the lateral shifts generated by first WFC element 208 or 308, and further blurs the image of the object. However, the circularly symmetric function promotes production of images that are relatively natural looking and may have relatively few artifacts. Accordingly, the circularly symmetric function may be well suited for applications when detection arm 330 is used to capture images that are pleasing to a human viewer. The circularly symmetric function may be expressed as:

$$P(\rho) = f(\rho) \quad \text{Equation (7)}$$

where $\rho^2 = x^2 + y^2$ and ρ is the radius of the Fourier plane 330A of detector arm 330, and f(ρ) is a high order polynomial.

Second WFC element 214 or 314 may be movable or removable for use in capturing scenes that do not need extended depth of field (e.g. when using system 200 or 300 as a camera).

In an alternative embodiment, first WFC element 208 or 308 may be circularly symmetric such that the projected grid lines advantageously do not suffer from focus-dependent lateral shift. However, modulation is undesirably spread evenly over all directions and not concentrated in the directions of the undistorted grid lines. In this configuration, second WFC element 214 or 314 may also be circularly symmetric for EDOF. As discussed above, second WFC element 214 or 314 are movable or removable in certain embodiments.

FIGS. 4-33 include simulated gray images of a grid and a single point at focus and defocus, contour plots of the grid and single point at focus and defocus, and simulated PSFs in three-dimensional mesh drawings at focus and at various amounts of defocus. These figures are provided for both conventional system 100 without a WFC element, and for optical system 200 or 300 with extended depth of field, that is, utilizing an exemplary first WFC element 208 or 308. Potential advantages of system 200 or 300 over the conventional system 100 are demonstrated in subsequent paragraphs below.

Figure 4:
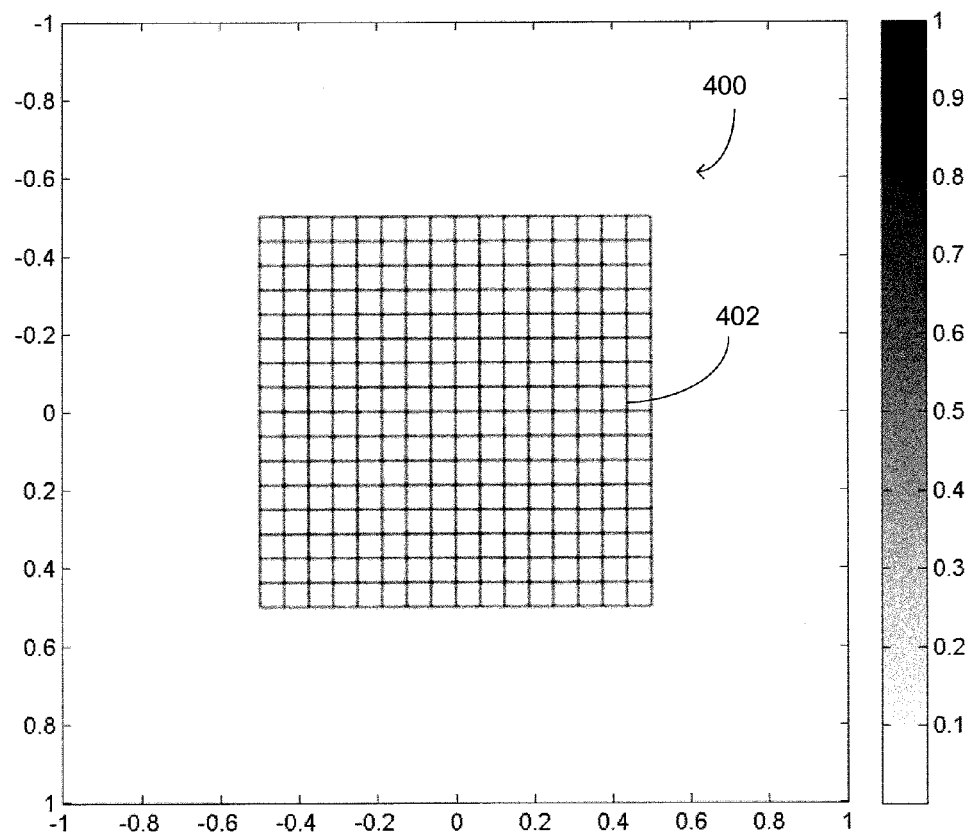
FIG. 4 is a gray image of a grid viewed by the conventional optical system of FIG. 1, at best focus.
Figure 5:
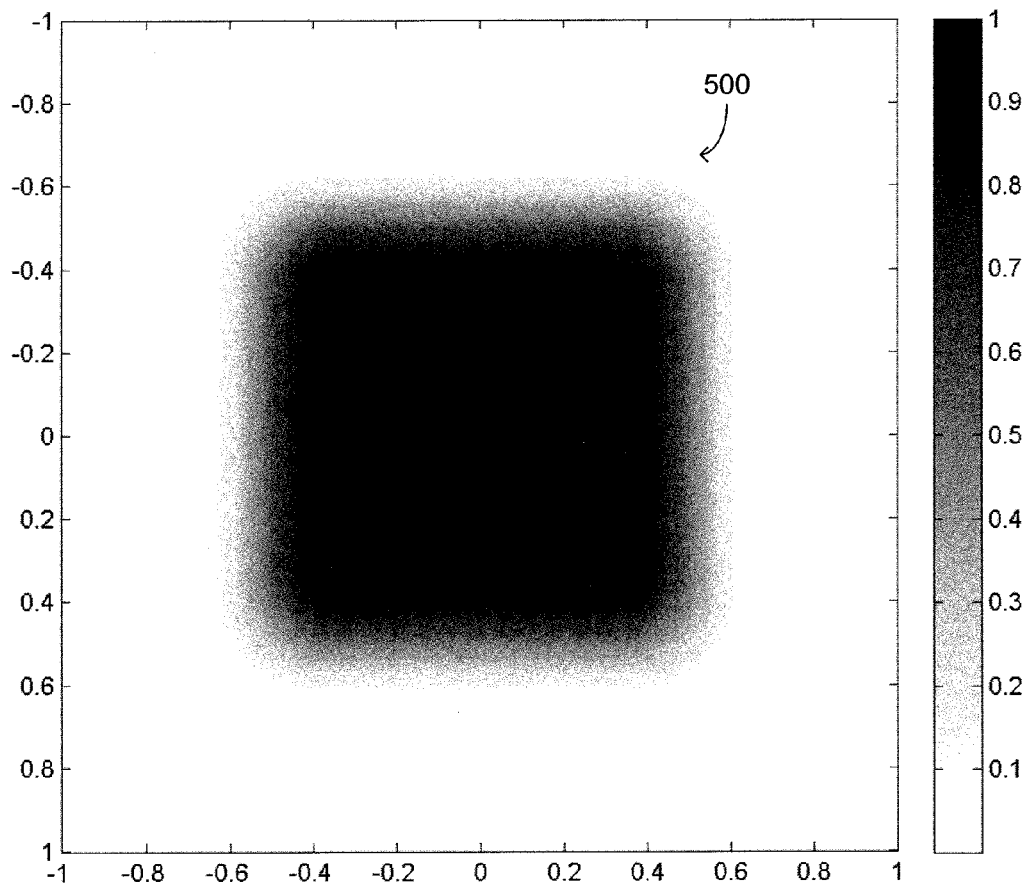
FIG. 5 is a gray image of a grid viewed by the conventional optical system of FIG. 1, at defocus of five waves.
Figure 6:
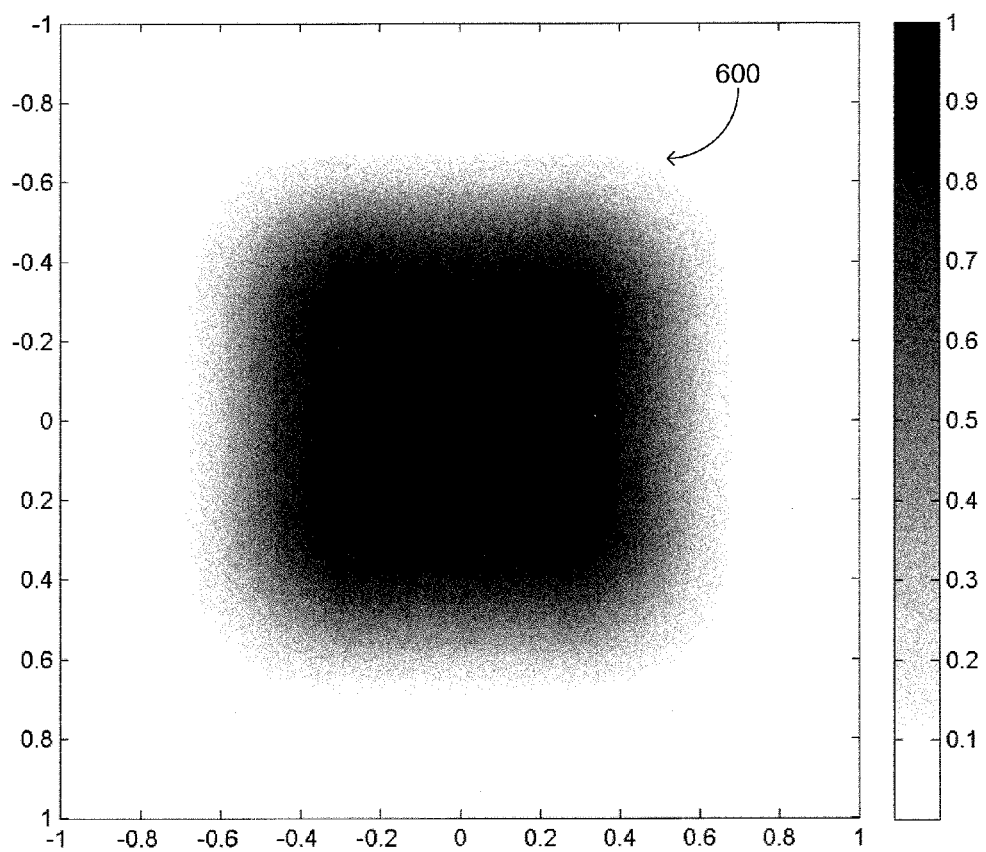
FIG. 6 is a gray image of a grid viewed by the conventional optical system of FIG. 1, at defocus of eight waves.

FIGS. 4-6 are gray images of a grid viewed by conventional optical system 100 of FIG. 1 at best focus or zero wave of defocus, five waves of defocus, and eight waves of defocus respectively, where a wave is defined as the center wavelength of illuminating light from a light source (e.g. from projector 102 in FIG. 1). Referring to FIG. 4 now, gray image 400 at best focus clearly shows a grid. Gray image 500 of FIG. 5 at five waves of defocus is blurred as compared to gray image 400. Referring to FIG. 6 now, gray image 600 at eight waves of defocus is even more blurred than gray image 500. Grid lines can not be seen clearly in gray images 500 and 600. Images 400, 500 and 600 are normalized with respect to their maximum values. Generally, conventional system 100 stops working at about a half wave of defocus.

Figure 7:
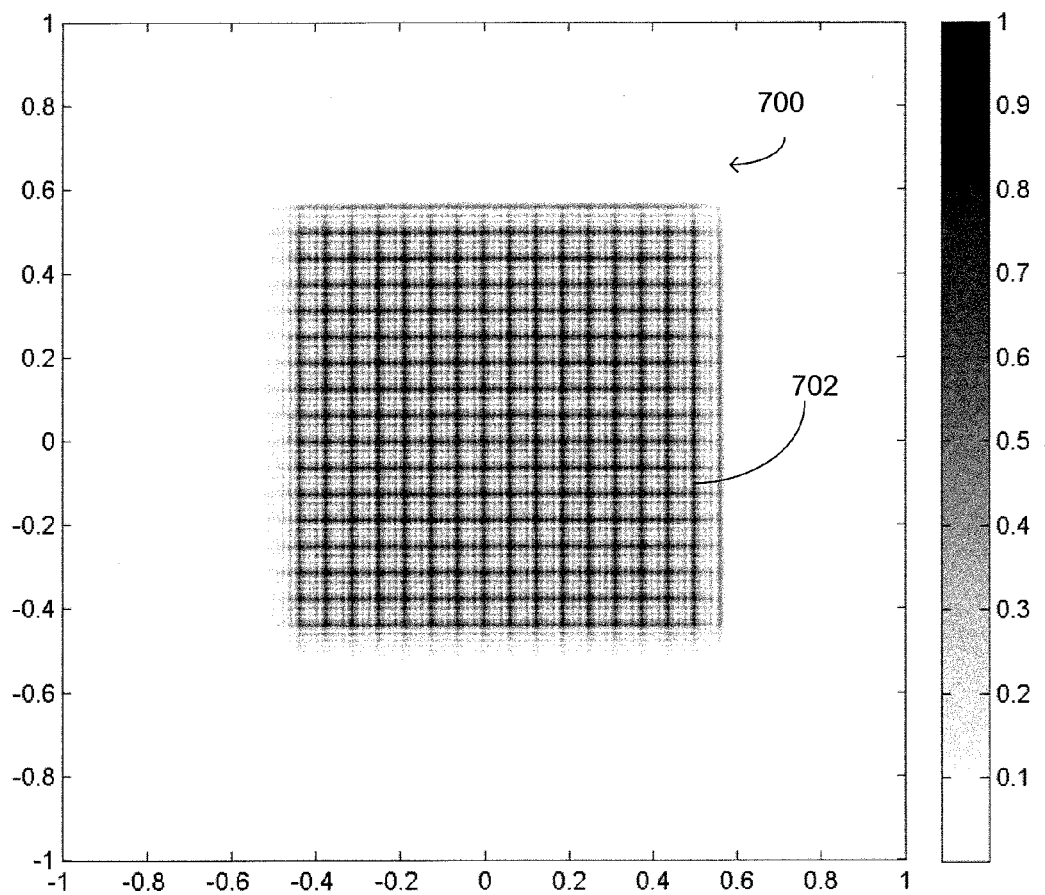
FIG. 7 is a gray image of a grid viewed by the extended depth of field optical system of FIG. 2 or FIG. 3, at best focus.
Figure 8:
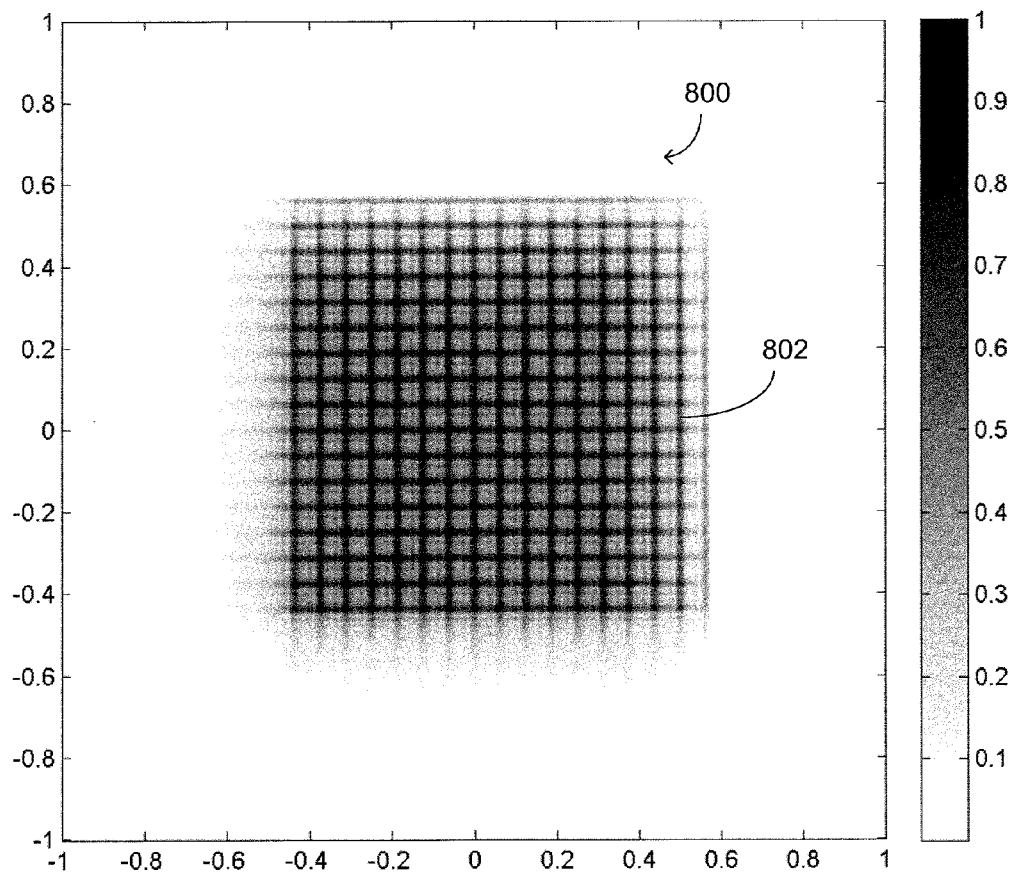
FIG. 8 is a gray image of a grid viewed by the optical system with extended depth of field of FIG. 2 or FIG. 3, at defocus of five waves.
Figure 9:
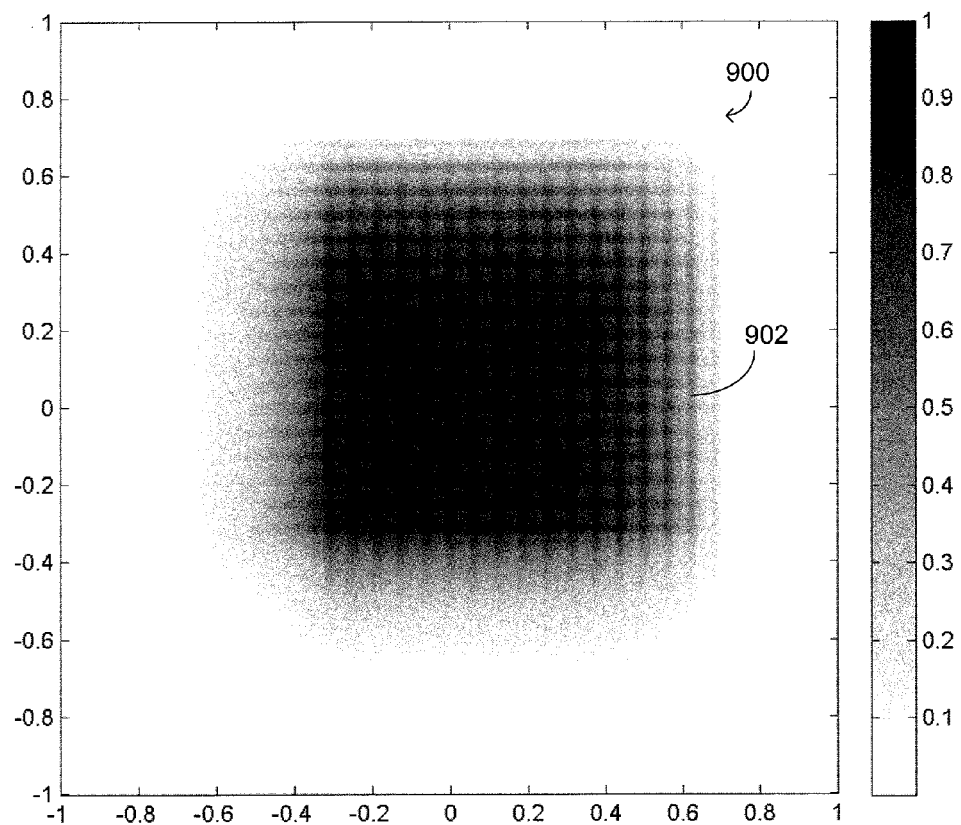
FIG. 9 is a gray image of a grid viewed by the optical system with extended depth of field of FIG. 2 or FIG. 3, at defocus of eight waves.

FIGS. 7-9 are gray images of a grid viewed by optical system 200 or 300 with extended depth of field at best focus, five waves of defocus, and eight waves of defocus, respectively. The WFC phase function used in all simulations is a cubic function with 6 waves of total phase deviation, and it is mathematically given by $$P(x,y)=1.5(x^3+y^3) \quad \text{Equation (8)}$$

where x and y are normalized to a range of −1 to 1 across the extent of the function (e.g., across a width of any of WFC elements 208, 308 or 314), with x=y=0 corresponding to the optical axis.

Specifically, FIG. 7 shows gray image 700 including grid lines 702, FIG. 8 shows gray image 800 including grid lines 802, and FIG. 9 shows gray image 900 including grid lines 902. As can be appreciated by comparing FIG. 4 to FIG. 7, system 200 or 300 does not image grid lines as clearly as system 100 at best focus. However, system 200 or 300 is advantageously able to image grid lines clearly at larger amounts of defocus than system 100. For example, as shown in FIGS. 8 and 9, system 200 or 300 can image grid lines clearly at a defocus of five or eight waves, while system 100 is unable to image grid lines at these amounts of defocus, as shown in FIGS. 5 and 6 where grid lines are not distinguishable.

Figure 10:
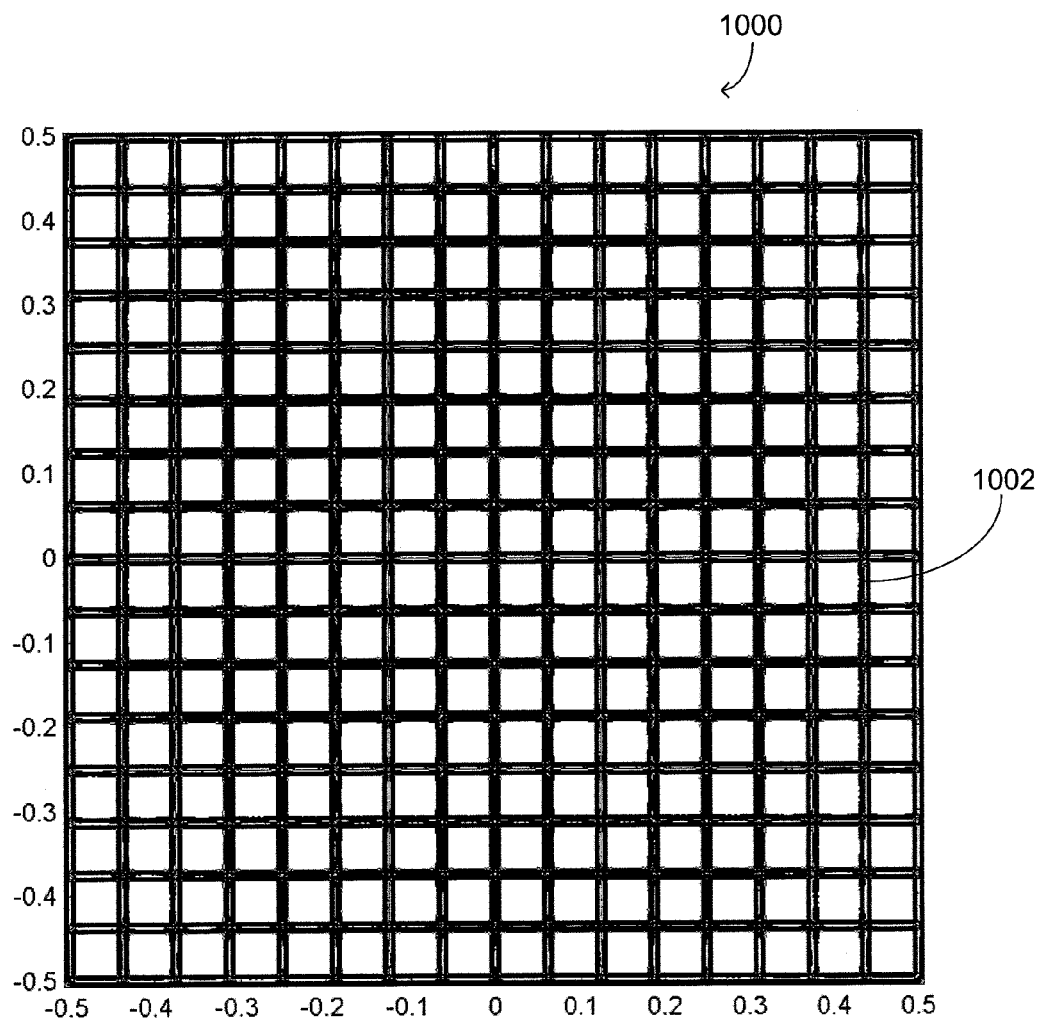
FIG. 10 is a contour plot of the grid of FIG. 4, viewed by the conventional optical system of FIG. 1, at best focus.
Figure 11:
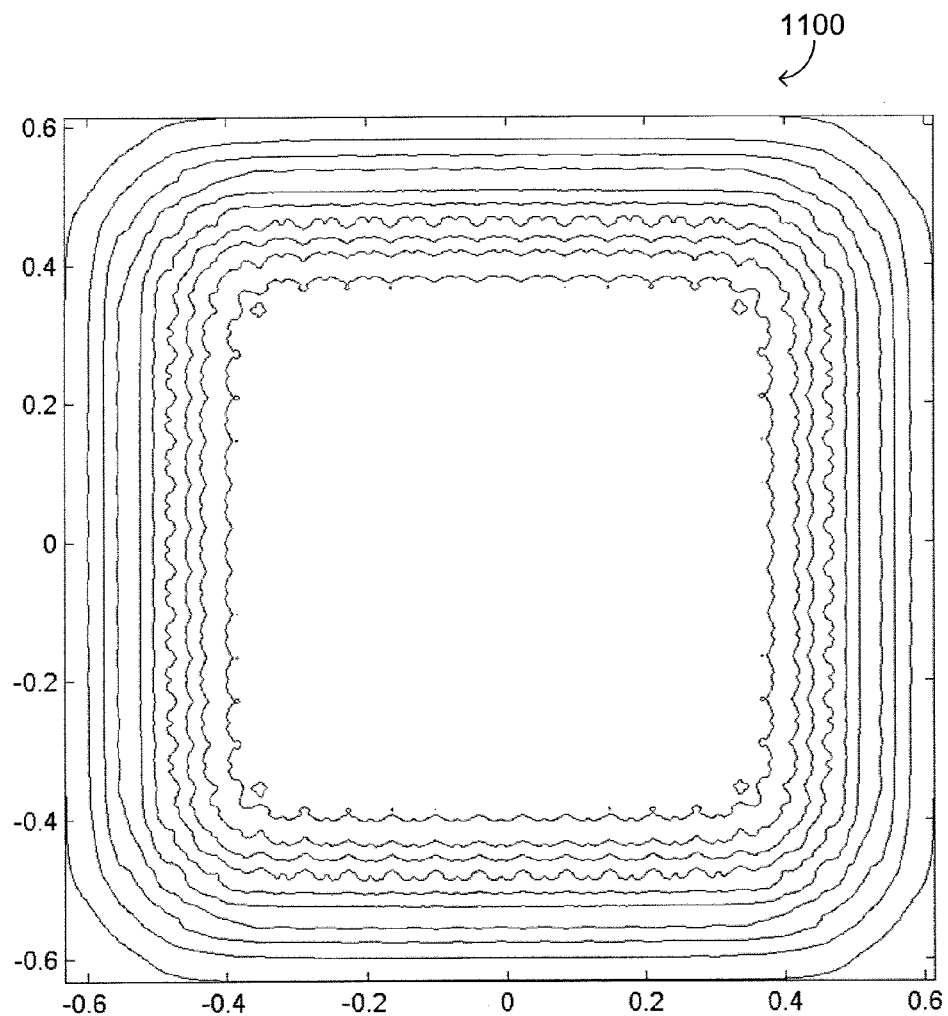
FIG. 11 is a contour plot of the grid of FIG. 5, viewed by the conventional optical system of FIG. 1, at defocus of five waves.
Figure 12:
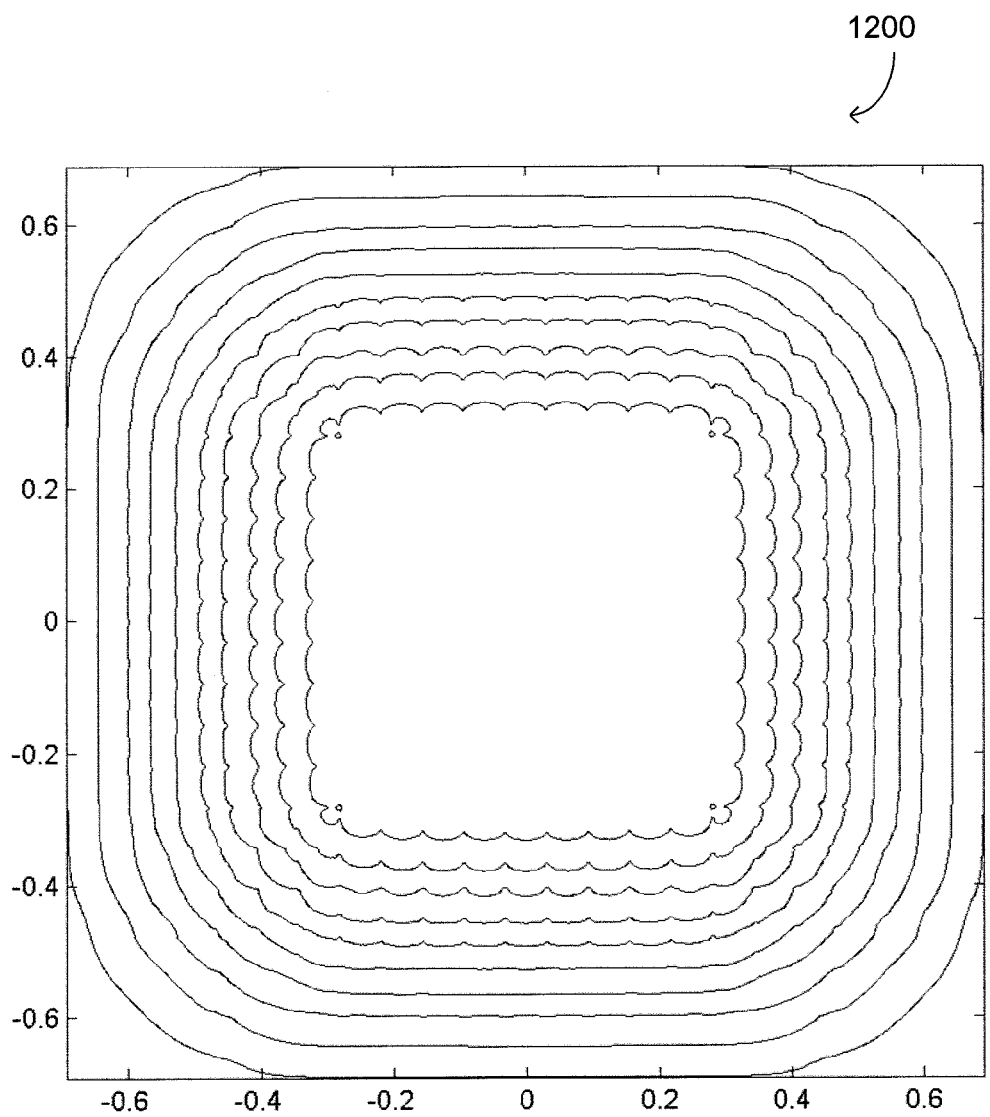
FIG. 12 is a contour plot of the grid of FIG. 6, viewed by the conventional optical system of FIG. 1, at defocus of eight waves.

FIGS. 10-12 are simulated contour plots of gray images 400, 500, and 600 by conventional system 100. As shown in FIG. 10, contour plot 1000 by conventional system 100 clearly reveals grid lines 1002 at best focus. However, contour plot 1100 at five waves of defocus and contour plot 1200 at eight waves of defocus do not show any grid lines, as illustrated in FIGS. 11 and 12, respectively. In other words, grid line image quality of conventional system 100 is sensitive to the depth of field.

Figure 13:
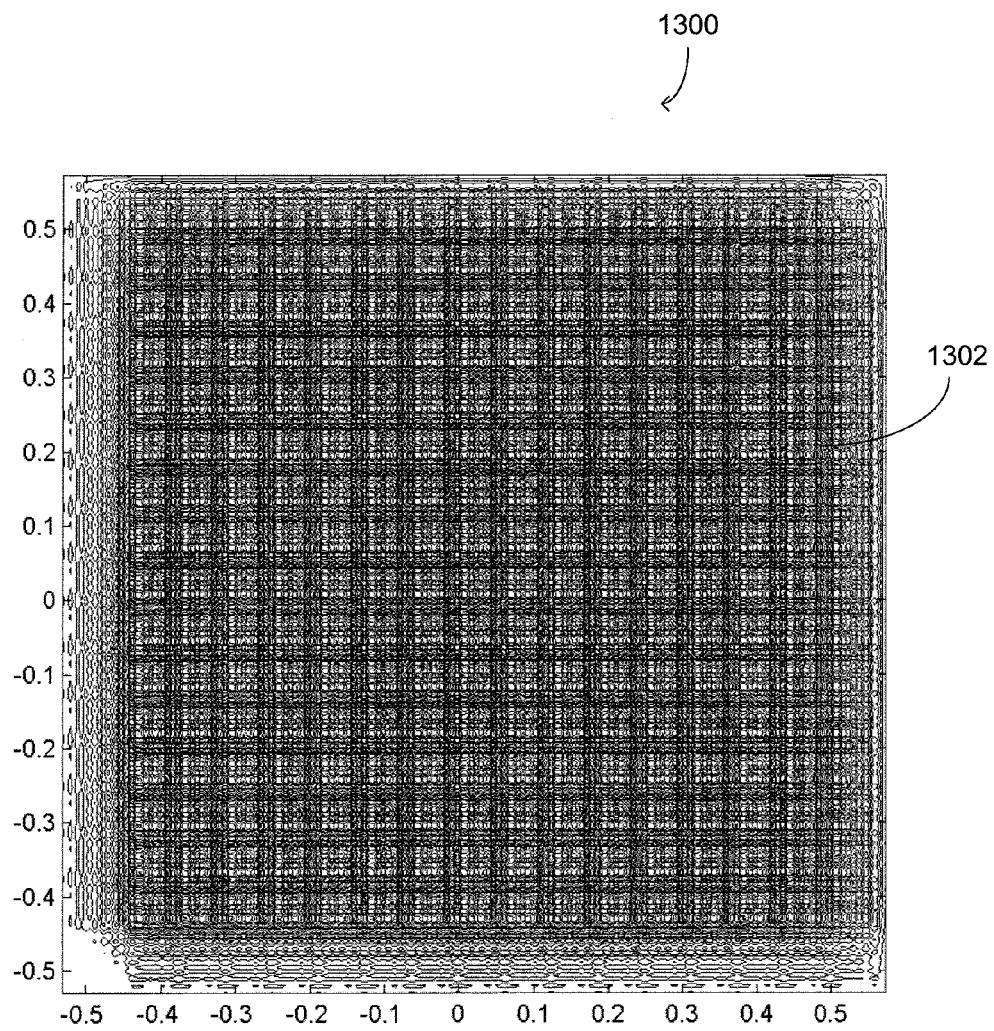
FIG. 13 is a contour plot of the grid of FIG. 7, viewed by the optical system with extended depth of field of FIG. 2 or FIG. 3, at best focus.
Figure 14:
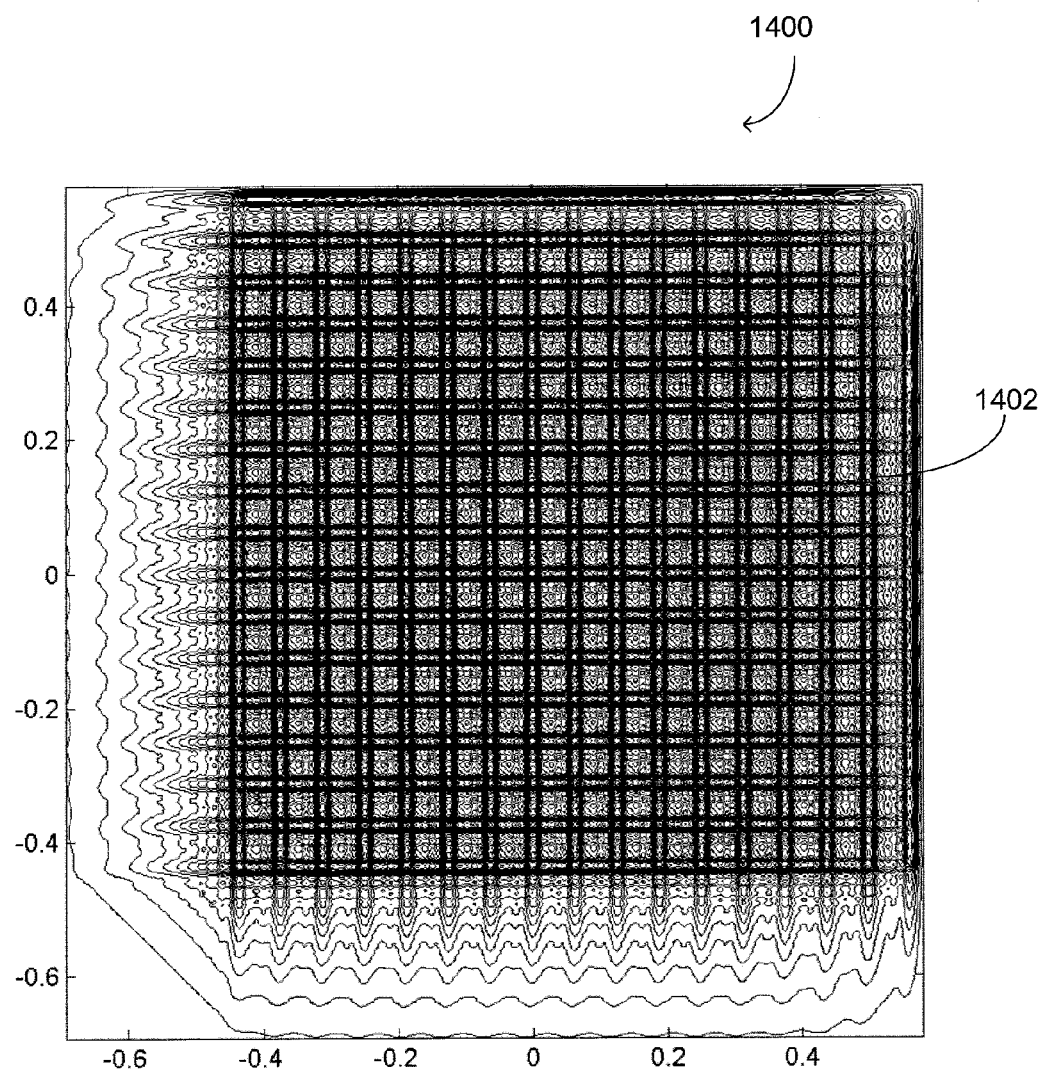
FIG. 14 is a contour plot of the grid of FIG. 8, viewed by the optical system with extended depth of field of FIG. 2 or FIG. 3, at defocus of five waves.
Figure 15:
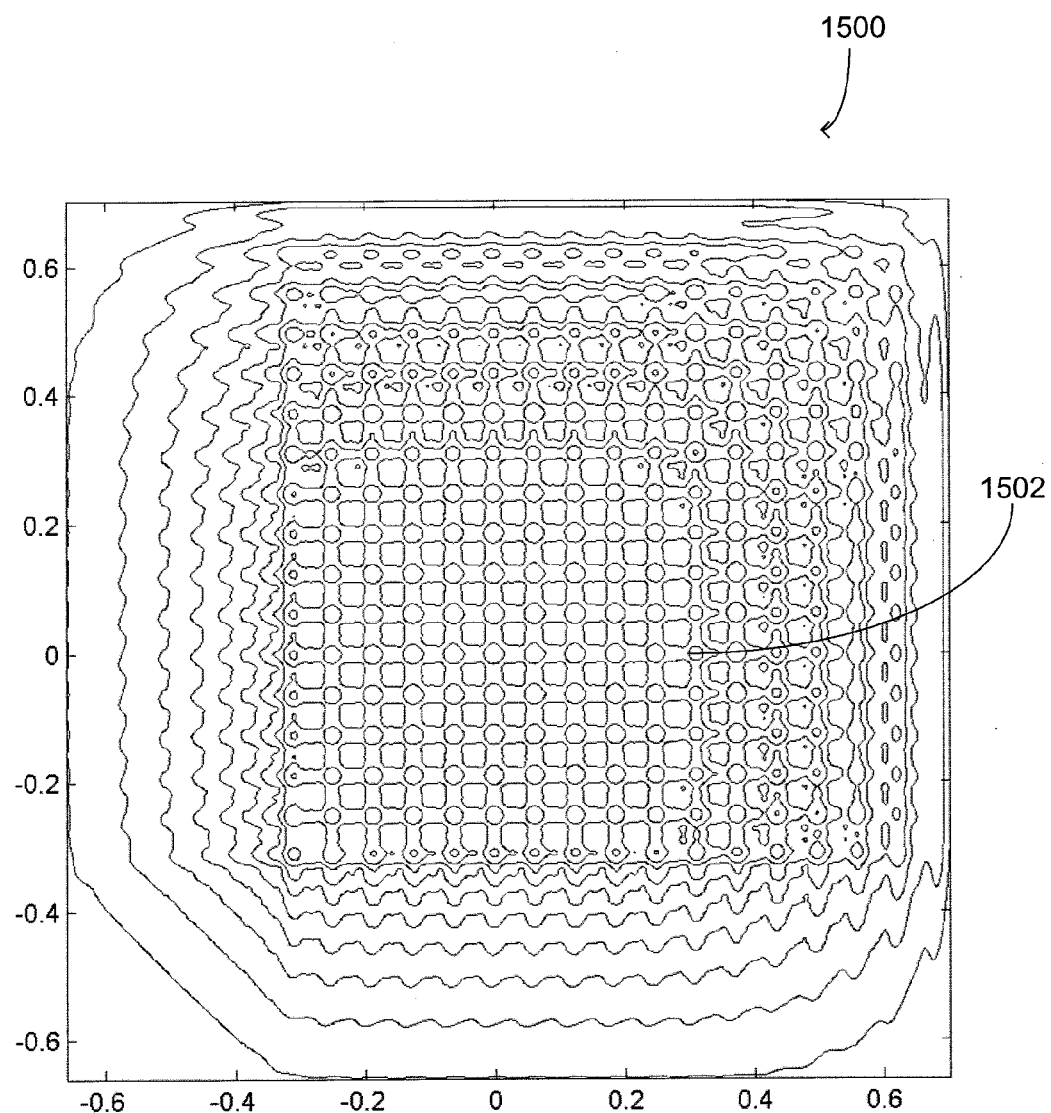
FIG. 15 is a contour plot of the grid of FIG. 9, viewed by the optical system with extended depth of field of FIG. 2 or FIG. 3, at defocus of eight waves.

FIGS. 13-15 are simulated contour plots 1300, 1400, and 1500 of gray images 700, 800 and 900, respectively. Thus, contour plot 1300 represents an image generated by system 200 or 300 at best focus, contour plot 1400 represents an image generated by system 200 or 300 at five waves of defocus, and contour plot 1500 represents an image generated by system 200 or 300 at eight waves of defocus. Grid lines 1302, 1402, and 1502 are visible in each of contour plots 1300, 1400, and 1500, respectively. Images are normalized with respect to their maximum amplitude, and a total of ten contours are shown, in each of contour plots 1300, 1400, and 1500. As illustrated in FIGS. 13-15, optical system 200 or 300 with first WFC element 208 or 308 reveals grid lines at both best focus and defocus. In other words, system 200 or 300 is less sensitive to the depth of field of grid mask 210 or 304 than conventional system 100.

Figure 16:
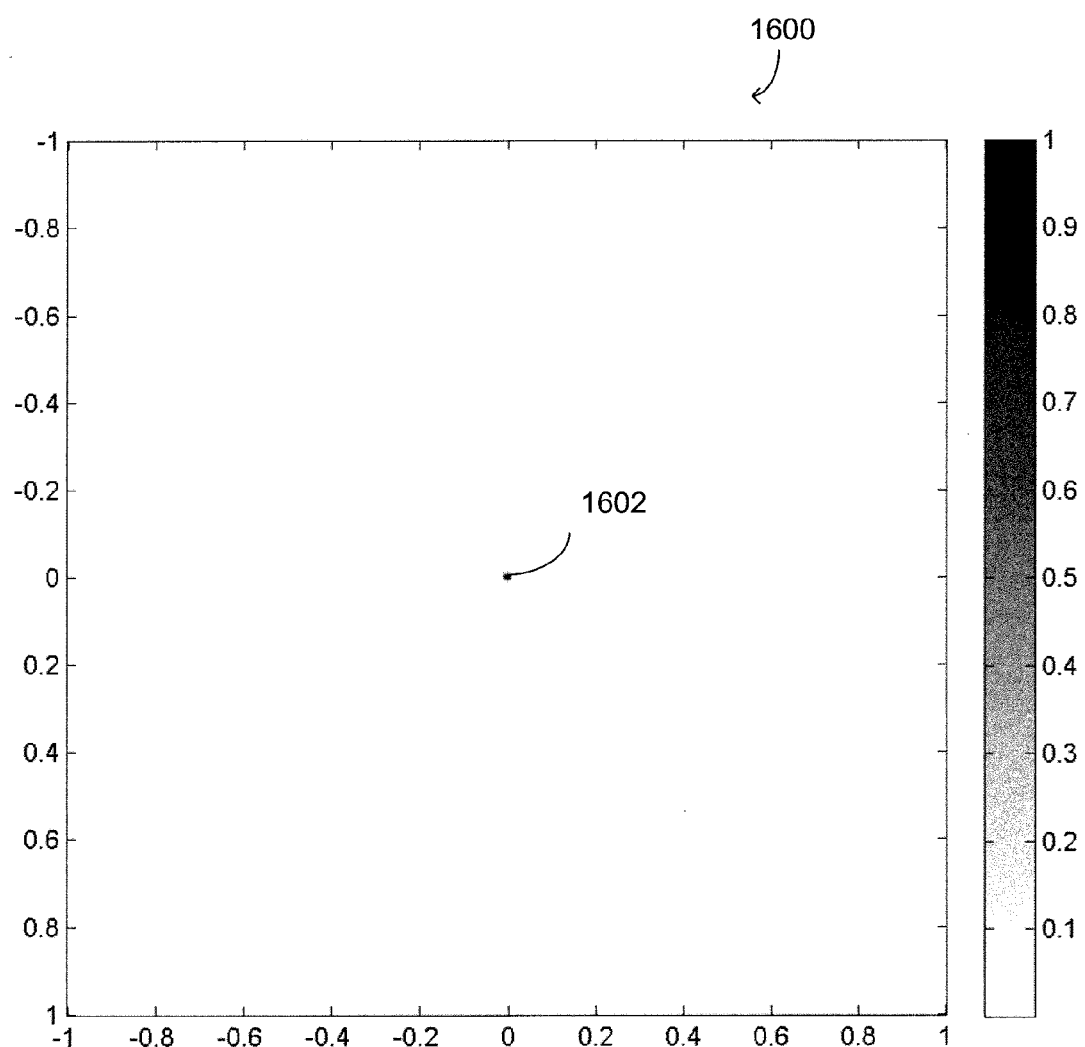
FIG. 16 is a gray image of a point (e.g. intersection of grid), viewed by the conventional optical system of FIG. 1, at best focus.
Figure 17:
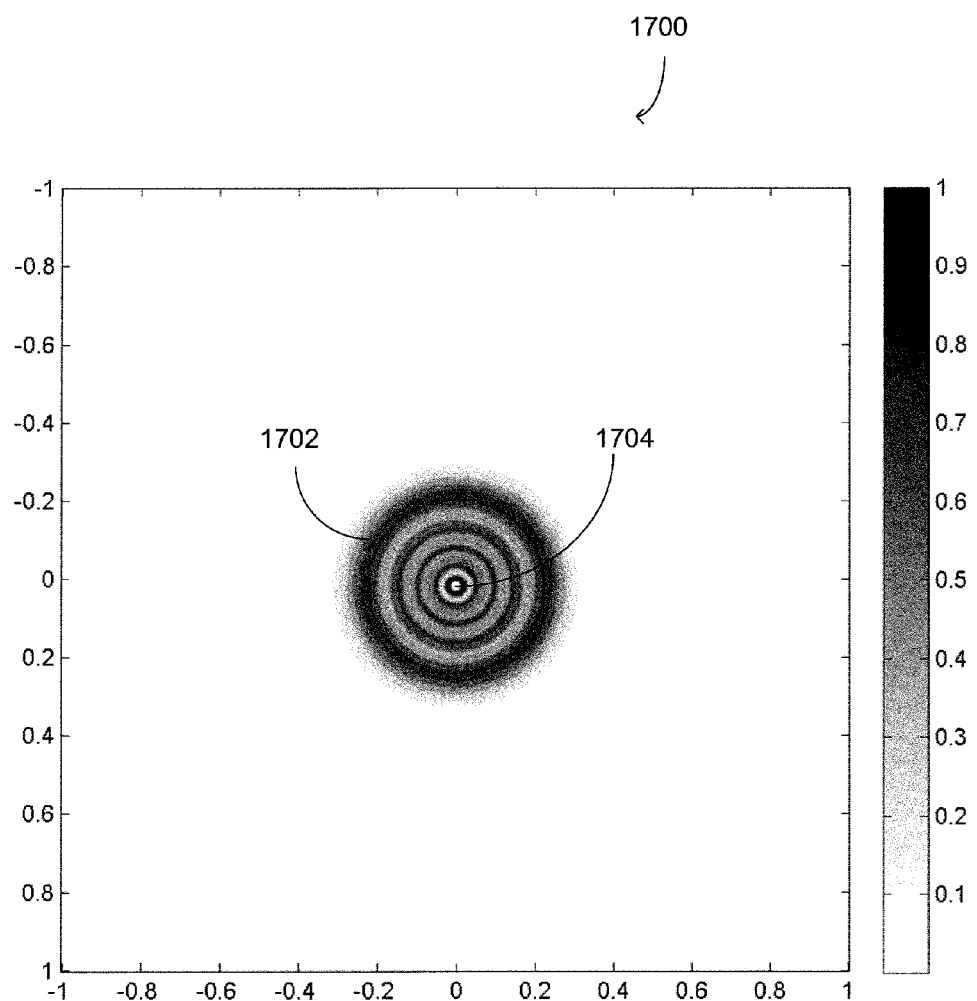
FIG. 17 is a gray image of the point of FIG. 16, viewed by the conventional optical system of FIG. 1, at defocus of five waves.
Figure 18:
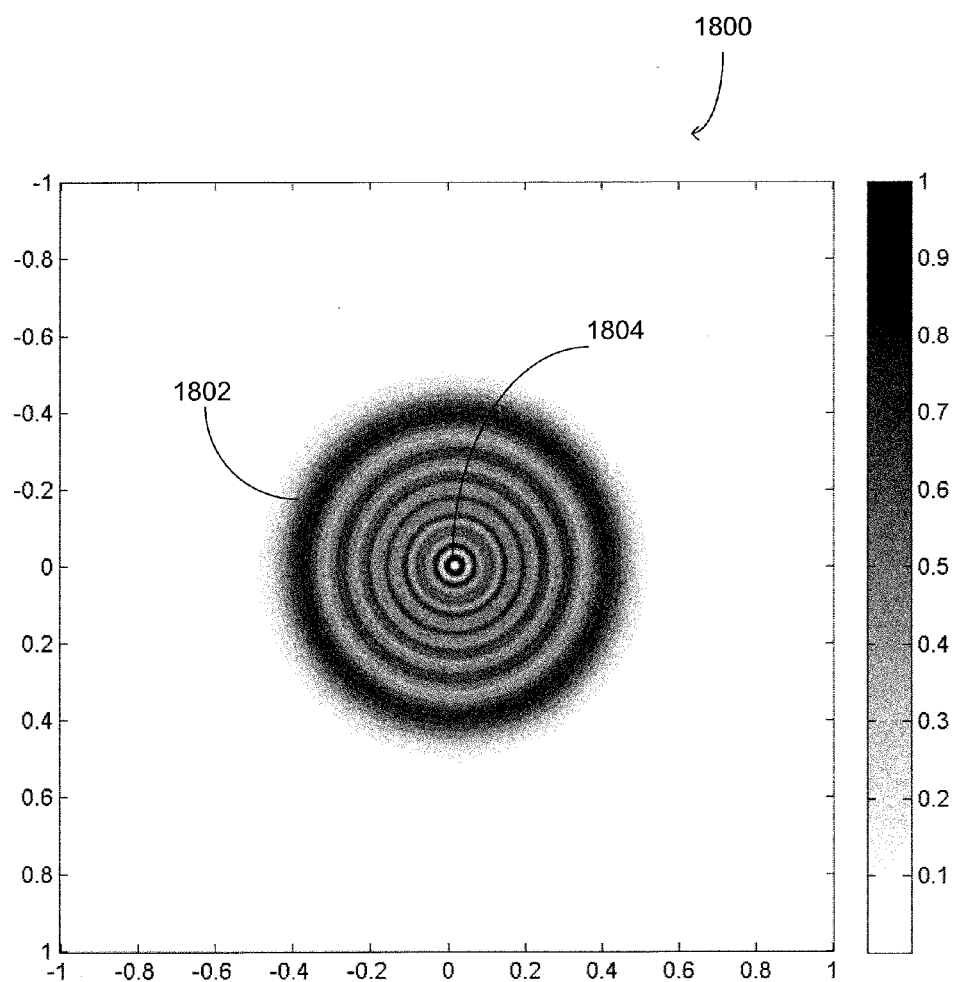
FIG. 18 is a gray image of the point of FIG. 16, viewed by the conventional optical system of FIG. 1, at defocus of eight waves.

FIGS. 16-18 are simulated gray images 1600, 1700 and 1800 of a single point imaged by conventional system 100 at best focus, five waves of defocus, and eight waves of defocus respectively. These images illustrate substituting a single point mask for the grid mask in simulations of conventional system 100, such that a point spread function (PSF) of the projector 102 of system 100 is obtained. As shown in FIG. 16, image 1600 reveals nearly a single point 1602 at best focus. However, images 1700 and 1800 at defocus are no longer confined to a point. Instead, image 1700 reveals a circular spot 1702 and the brightest spot 1704 in the center of circular spot 1702, and image 1800 reveals a large circular spot 1802 and the brightest spot 1804 in the center of circular spot 1802. Circular spot 1802 is larger than circular spot 1702.

Figure 19:
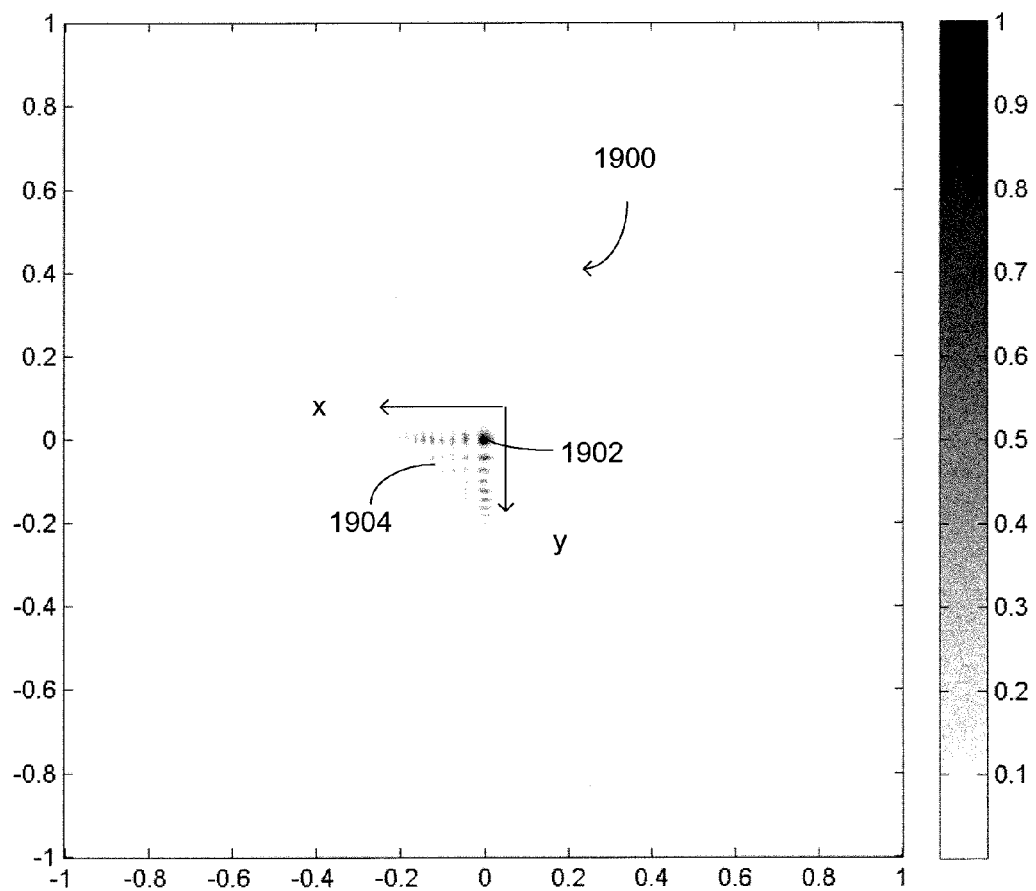
FIG. 19 is a gray image of a point (e.g. intersection of grid), viewed by the optical system with extended depth of field of FIG. 2 or FIG. 3, at best focus.
Figure 20:
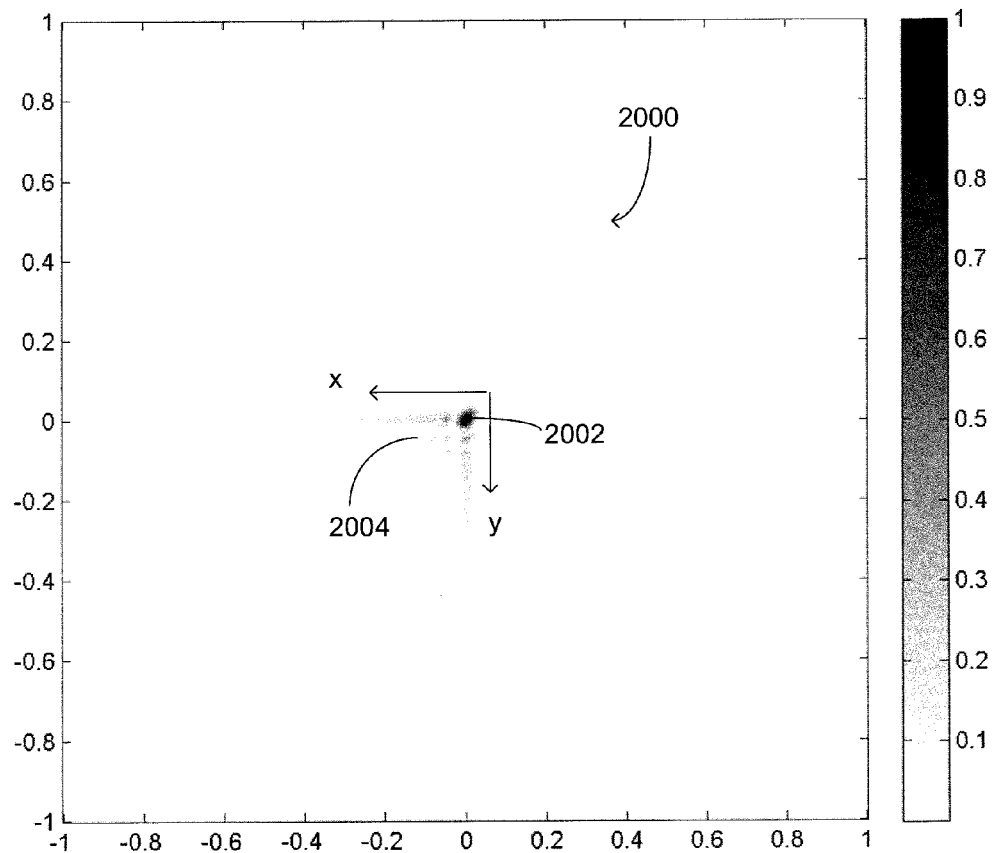
FIG. 20 is a gray image of the point of FIG. 19, viewed by the optical system with extended depth of field of FIG. 2 or FIG. 3, at defocus of five waves.
Figure 21:
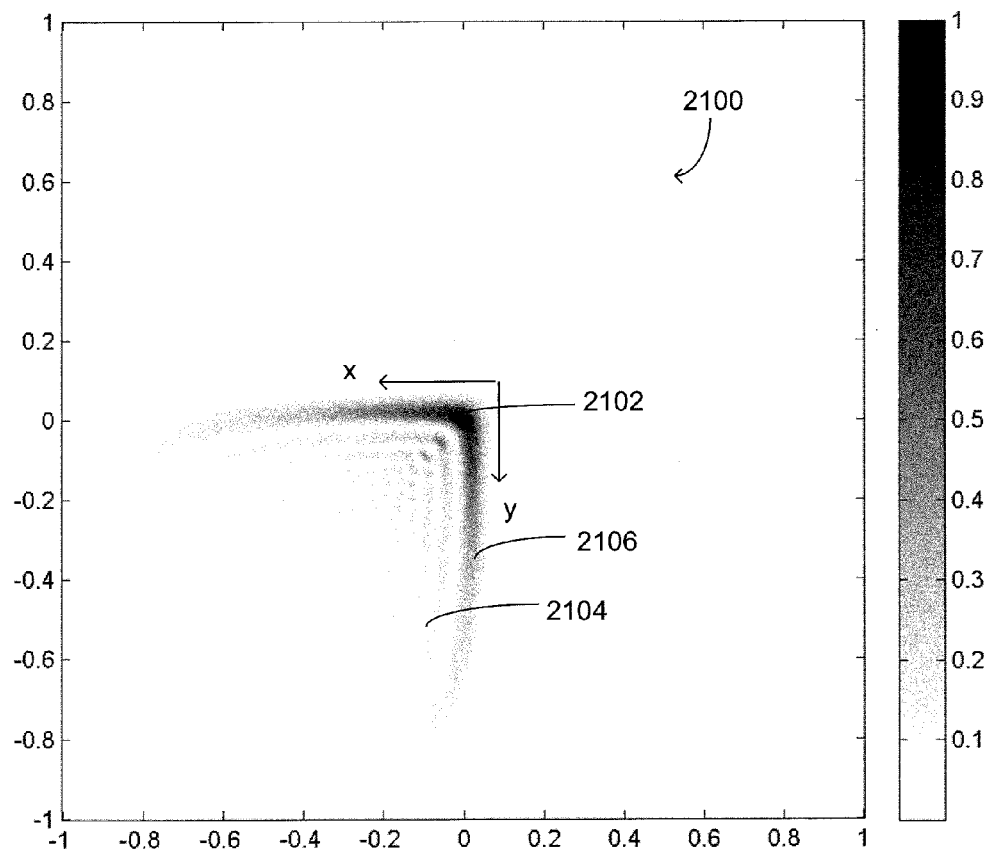
FIG. 21 is a gray image of the point of FIG. 19, viewed by the optical system with extended depth of field of FIG. 2 or FIG. 3, at defocus of eight waves.

FIGS. 19-21 are simulated gray patterns 1900, 2000, 2100 of a point imaged by optical system 200 or 300 at best focus, five waves of defocus, and eight waves of defocus, respectively. These figures illustrate substituting a single point mask for grid mask 304 in simulations, such that a point spread function (PSF) of the projector arm 320 of imaging system 300 is obtained. Gray pattern 1900 (FIG. 19) includes dots 1904 in a substantially triangular shape with a right angle, and reveals a darkest point 1902 at a corner of the right angle of the triangular shape. The darkest spot 1902 is actually the brightest spot in a real image because of the inverted gray scale in FIG. 19.

The triangular shape is a result of the extended phase modulation along the horizontal and vertical axes because of the use of the cubic function. If a circularly symmetric phase function had been used, for example, the resulting PSF would also be circularly symmetric.

The lateral shift arises as a result of the superposition of a second order phase deviation (defocus) over a third order phase deviation (the cubic phase function) of opposite signs, resulting in a linear phase teen with slope that varies as a function of defocus. The Fourier transform of a linear phase slope is a spatial shift proportional to the slope and, therefore, proportional to the amount of defocus. The amount of defocus, on the other hand, is proportional to the distance between a given point at the scene and the plane of best focus.

Gray pattern 2000 of FIG. 20 includes dots 2004 mainly along the x axis and y axis and the darkest spot 2002 near the intersection of the x axis and the y axis. Gray pattern 2100 of FIG. 21 includes dark stripes 2106 near the x axis and the y axis. Gray pattern 2100 also includes lighter stripes 2104 away from the x axis and the y axis. Images use inverted color scale for clarity (that is, dark spots represent points of stronger light brightness). Thus, a "light stripe" would actually have less light than a "dark stripe". The darkest spot 2102 is near the intersection of the x axis and the y axis. Thus, spots 2002 and 2102 of gray patterns 2000 and 2100 viewed in system 200 or 300 appear to be darker and far more compact than the respective spots 1702 and 1802 seen in system 100, indicating a better ability to detect a single point at defocus.

The differences between small spot 1602 at best focus and larger circular spots 1702 and 1802 at defocus (FIGS. 16-18) are much larger than the differences between darkest spot 1902 at best focus and darkest spots 2002 and 2102 at defocus. In other words, system 200 or 300 can detect a single point better than conventional system 100 at various amounts of defocus, which can also be illustrated by comparing PSFs of projector 102 of conventional optical system 100 with PSFs of projection arm 220 or 320 of system 200 or 300. Imaging systems are usually assumed to be linear, in which case superposition applies. That is, any image can be decomposed as a summation of points, and the ability to accurately detect or project a single point indicates the ability to accurately detect or project the multiple points that form any given image.

Figure 22:
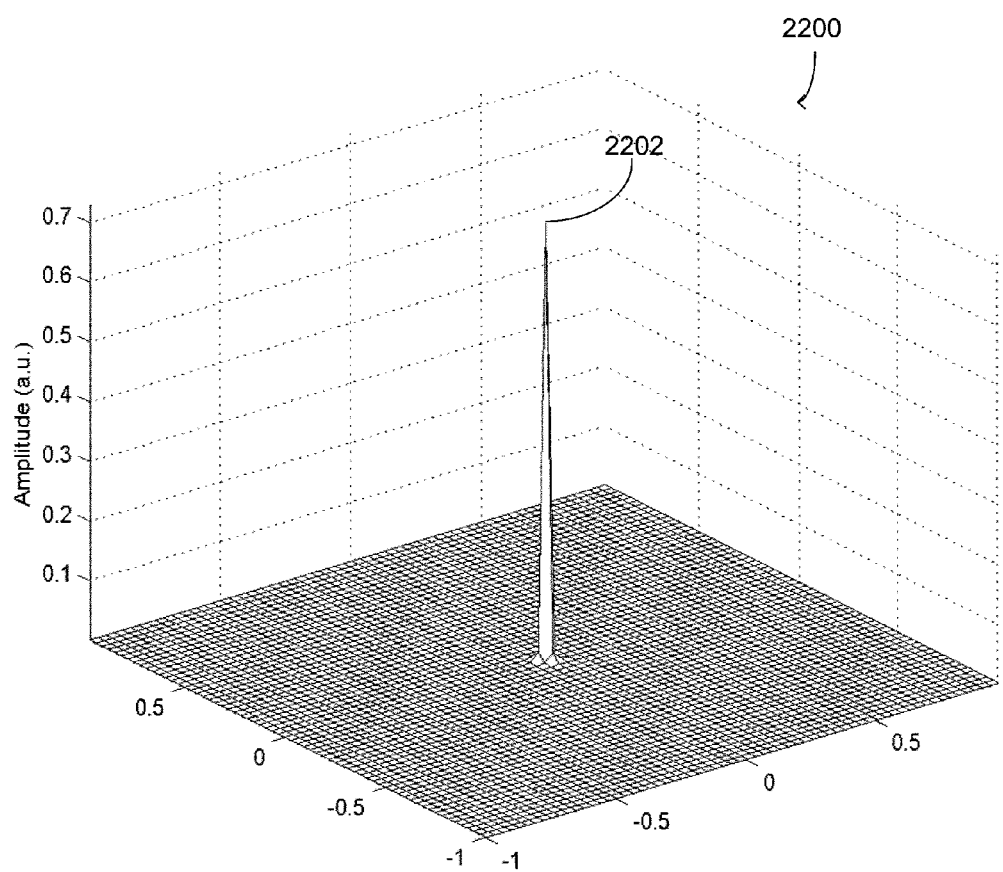
FIG. 22 is a point spread function (PSF) of the conventional optical system of FIG. 1, at best focus.
Figure 23:
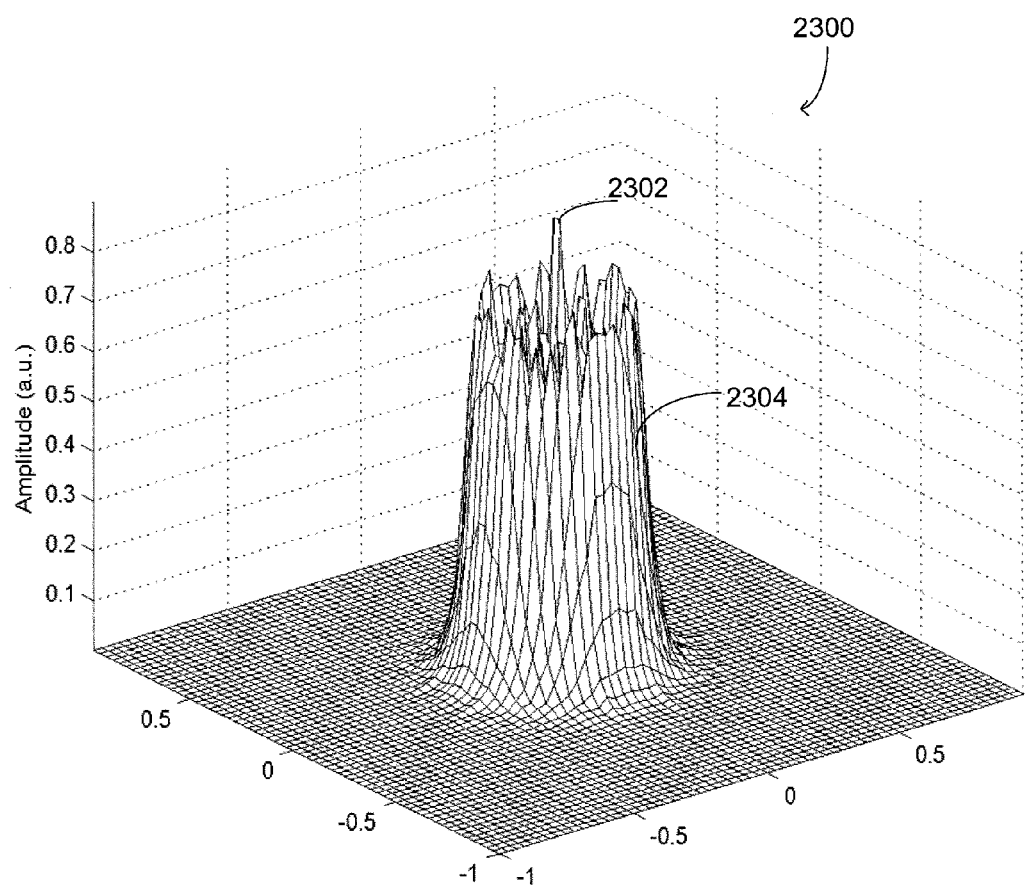
FIG. 23 is a PSF of the conventional optical system of FIG. 1, at defocus of five waves.
Figure 24:
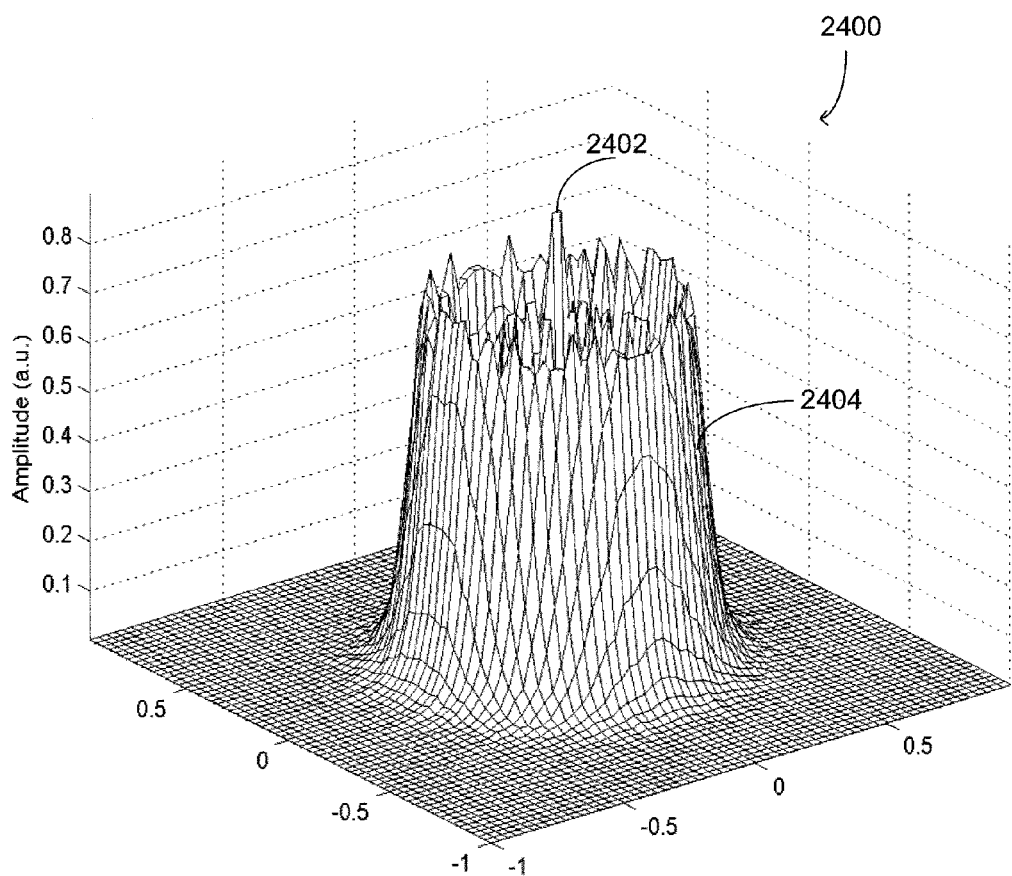
FIG. 24 is a PSF of the conventional optical system of FIG. 1, at defocus of eight waves.

FIGS. 22-24 are three-dimensional graphical representations of PSFs 2200, 2300, and 2400 of projector 102 of conventional system 100 at best focus, five waves of defocus, and eight waves of defocus, respectively. PSF 2200 at best focus is quite different from PSF 2300 at five waves of defocus and PSF 2400 at eight waves of defocus. Major peaks 2202, 2302 and 2402 correspond to darkest or brightest spots 1602, 1704 and 1804 of FIGS. 16, 17, and 18, respectively. The darkest spot 1602, would be the brightest spot in a real image, because the gray scale is inverted to make the images easier to visualize in a white (paper) background. The large differences among the PSFs suggest that it is difficult to detect a point by conventional system 100 at five waves of defocus or eight waves of defocus.

Figure 25:
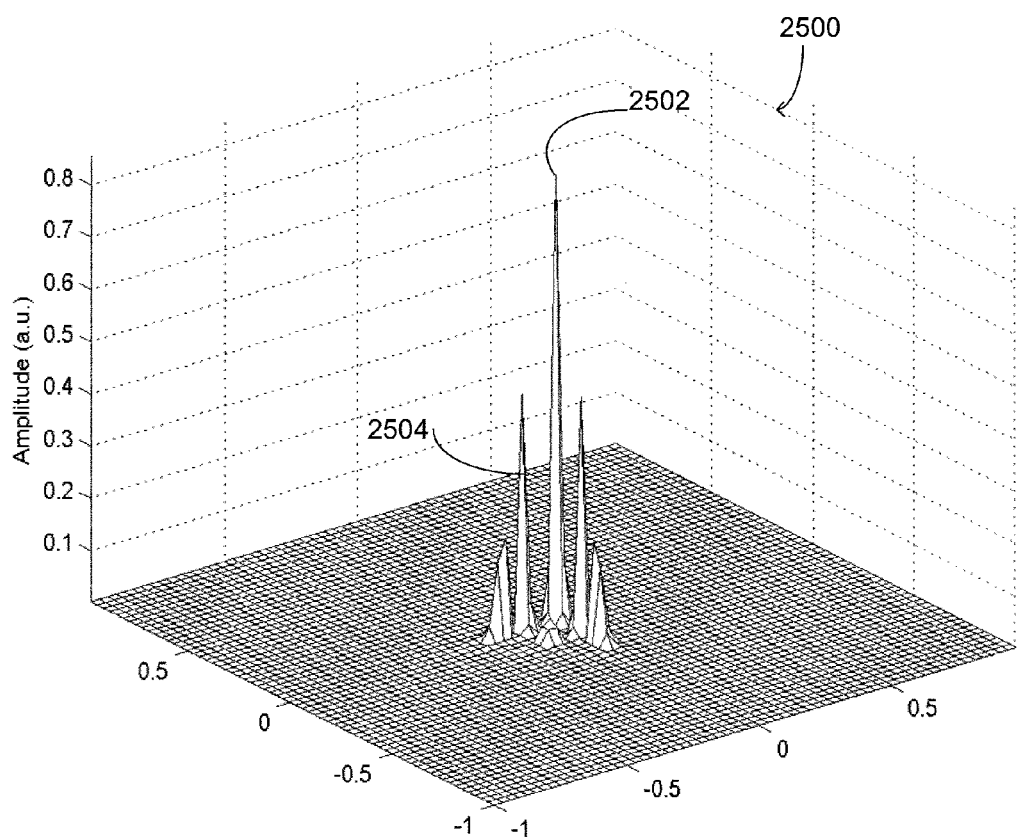
FIG. 25 is a PSF of the optical system with extended depth of field of FIG. 2 or FIG. 3, at best focus.
Figure 26:
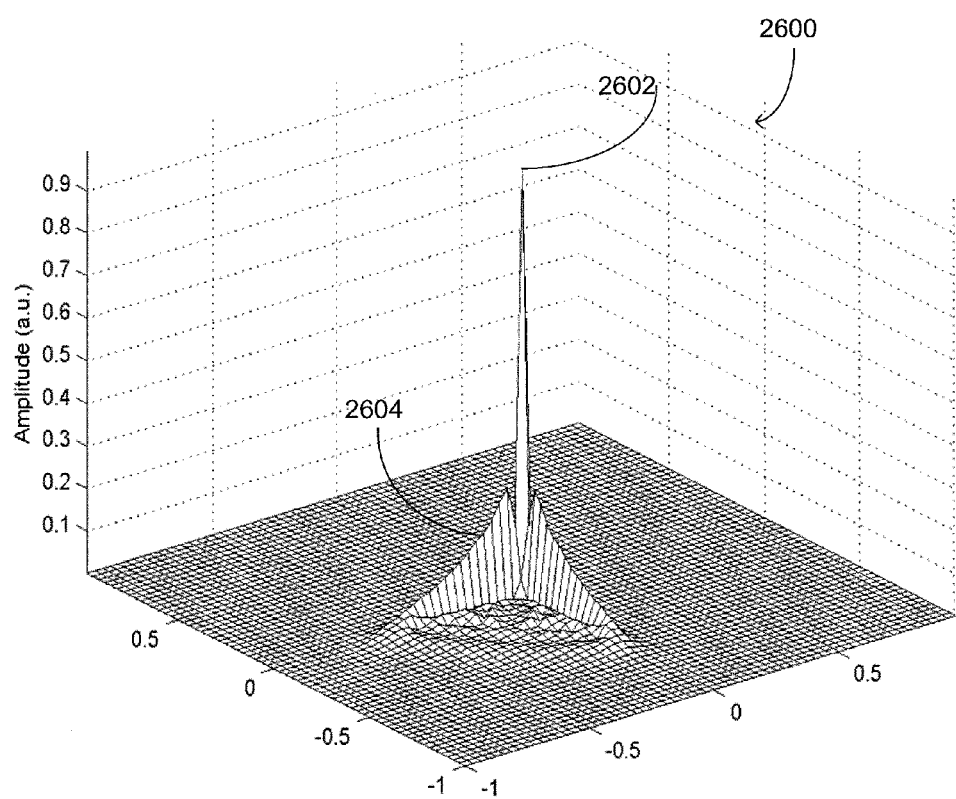
FIG. 26 is a PSF of the optical system with extended depth of field of FIG. 2 or FIG. 3, at defocus of five waves.
Figure 27:
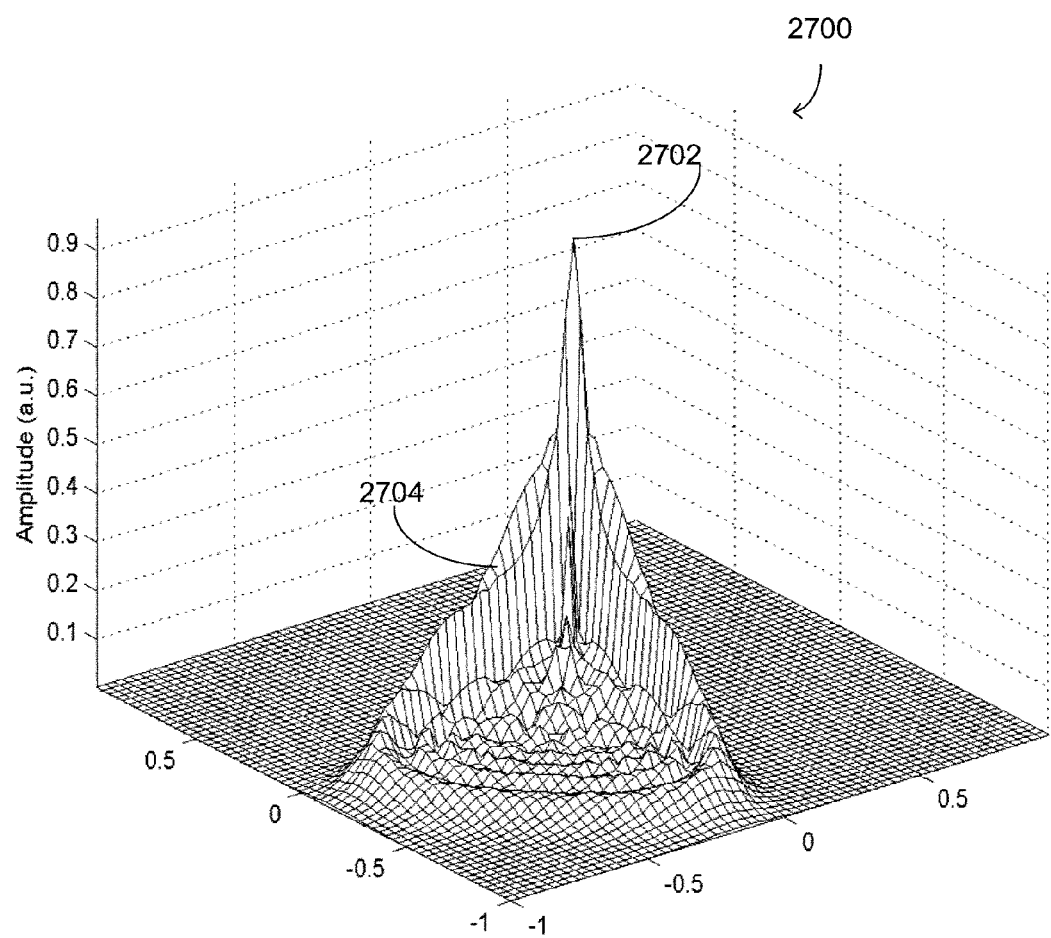
FIG. 27 is a PSF of the optical system with extended depth of field of FIG. 2 or FIG. 3, at defocus of eight waves.

FIGS. 25-27 are three-dimensional graphical representations of PSFs 2500, 2600, and 2700 of projection arm 220 or 320 of system 200 or 300 with first WFC element 208 or 308 at best focus, five waves of defocus, and eight waves of defocus respectively. Referring to FIG. 25, PSF 2500 at best focus includes a major peak 2502 and small peaks 2504 near the major peak 2502. Referring to FIG. 26, PSF 2600 at five waves of defocus includes a major peak 2602 and weak peaks 2604 near major peak 2602. Referring to FIG. 27, PSF 2700 at eight waves of defocus still includes a major peak 2702 and weak peaks 2704 near major peak 2702. Weak peaks 2704 at eight waves of defocus appear to be more significant than weak peaks 2604 at five waves of defocus. The major peaks 2502, 2602 and 2702 correspond to the darkest spots 1902, 2002 and 2102 of FIGS. 19, 20, and 21 respectively. Regardless of focus or defocus, major peaks 2502, 2602, and 2702 can be detected by optical system 200 or 300 with the first WFC element 208 or 308. In other words, in system 200 or 300, PSF 2500 at best focus is similar to PSFs 2600 and 2700 at defocus. In contrast, in system 100, PSF 2200 at best focus is very different from PSFs 2300, and 2400 at defocus. More specifically, the PSFs of system 200 or 300 do not change much at a large amount of defocus, even at eight waves of defocus.

Figure 28:
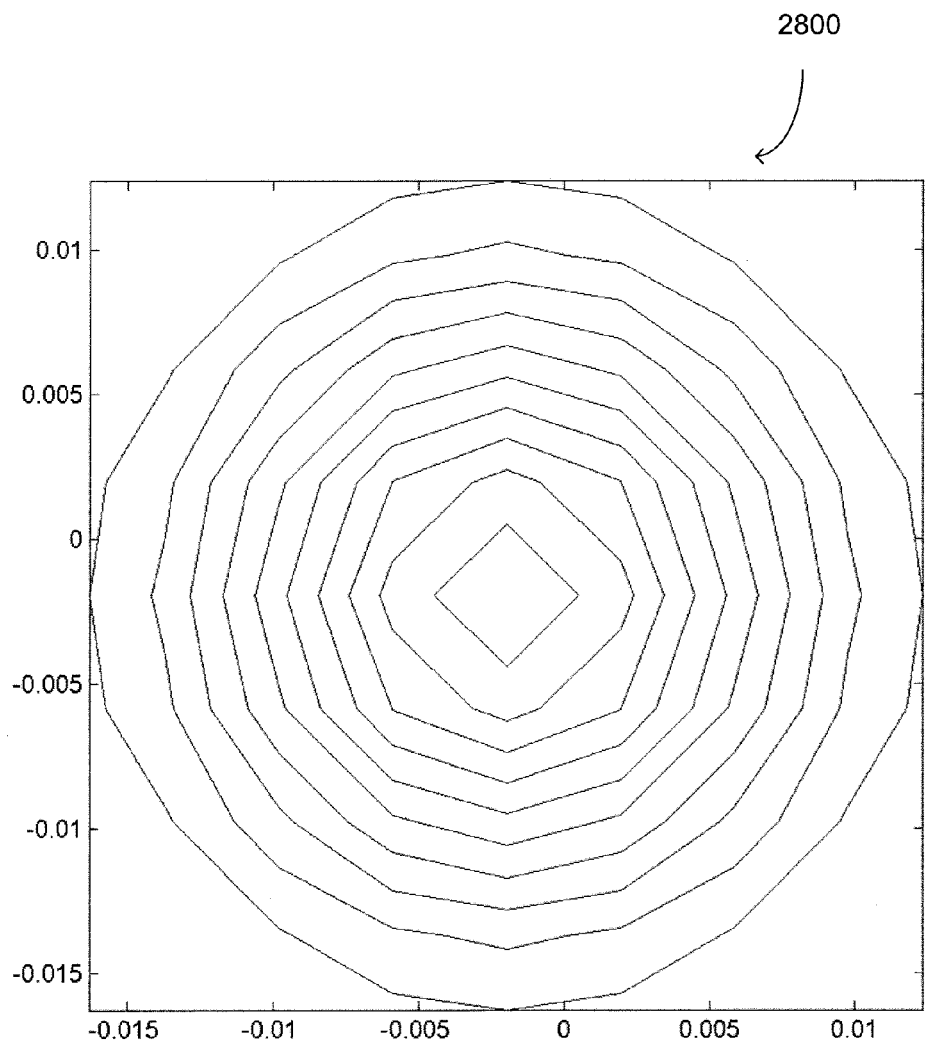
FIG. 28 is a contour plot of the point of FIG. 16, viewed by the conventional optical system of FIG. 1, at best focus.
Figure 29:
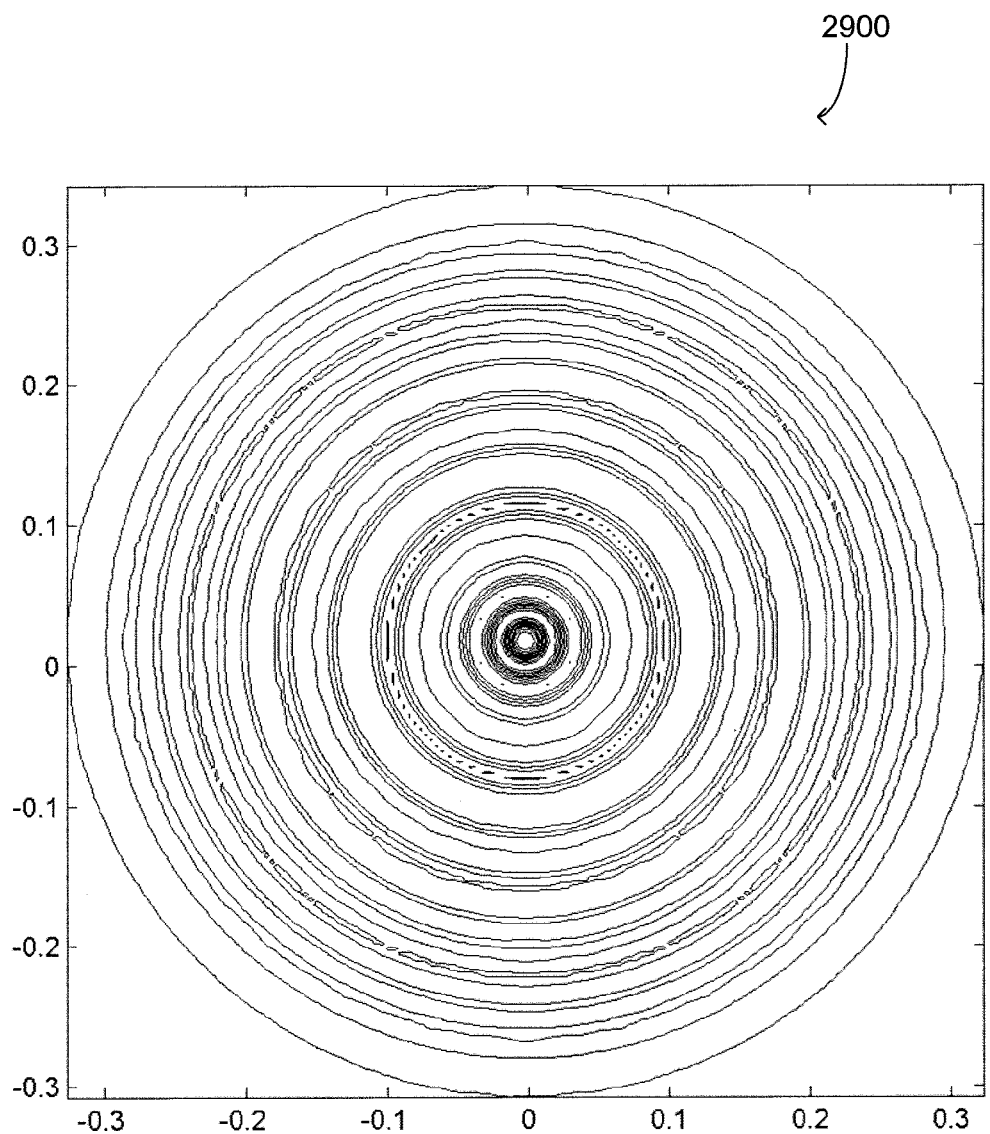
FIG. 29 is a contour plot of the point of FIG. 17, viewed by the conventional optical system of FIG. 1, at defocus of five waves.
Figure 30:
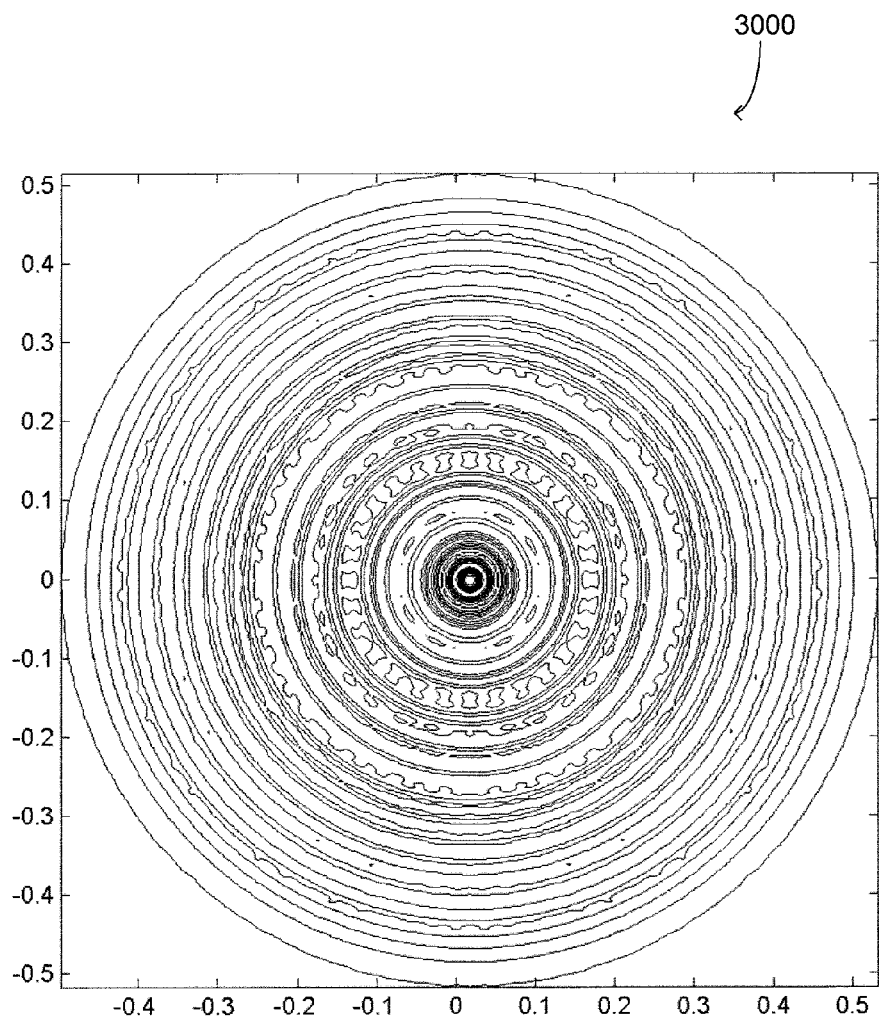
FIG. 30 is a contour plot of the point of FIG. 18, viewed by the conventional optical system of FIG. 1, at defocus of eight waves.

FIGS. 28-30 are simulated contour plots 2800, 2900, and 3000 of gray images 1600, 1700, and 1800 by conventional system 100 at best focus, five waves of defocus, and eight waves of defocus, respectively. FIGS. 28-30 are normalized with respect to their individual maximum amplitude, and ten contour levels were used in each case. Also, contour plots 2800, 2900, and 3000 are zoomed around the largest contour level so that detail is clearly shown.

Figure 31:
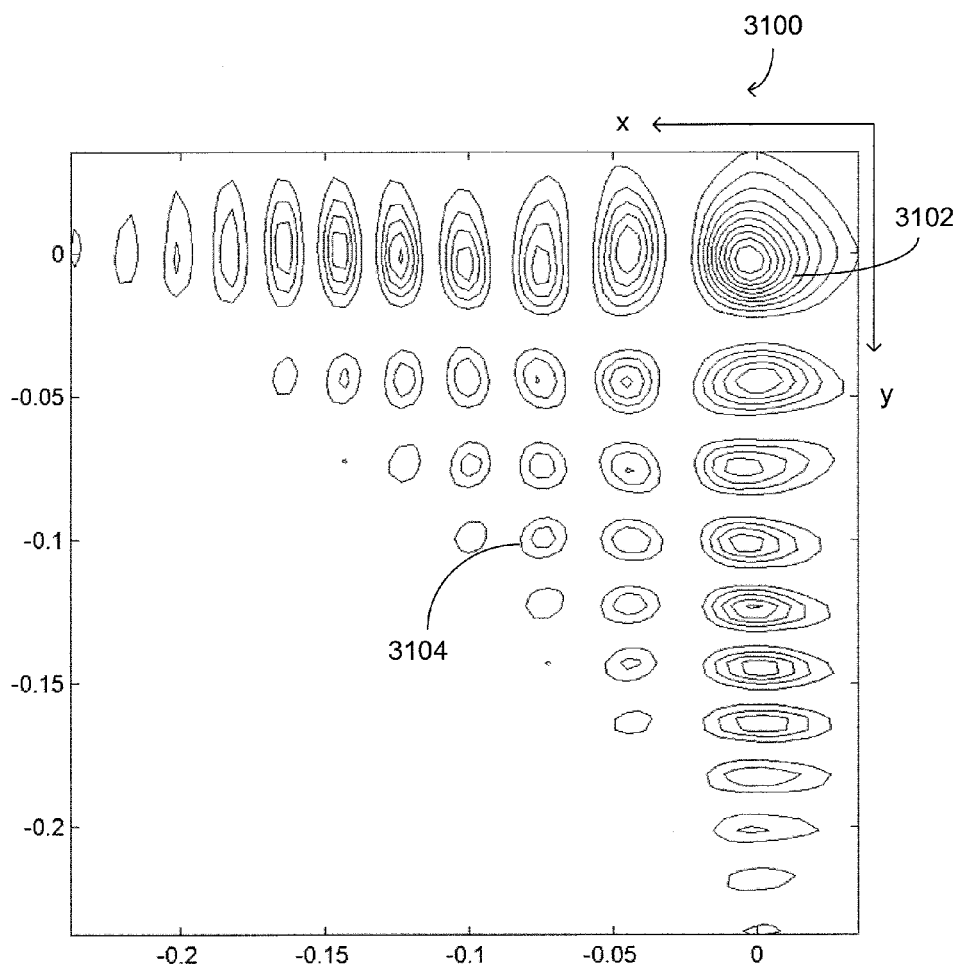
FIG. 31 is a contour plot of the point of FIG. 19, viewed by the optical system with extended depth of field of FIG. 2 or FIG. 3, at best focus.
Figure 32:
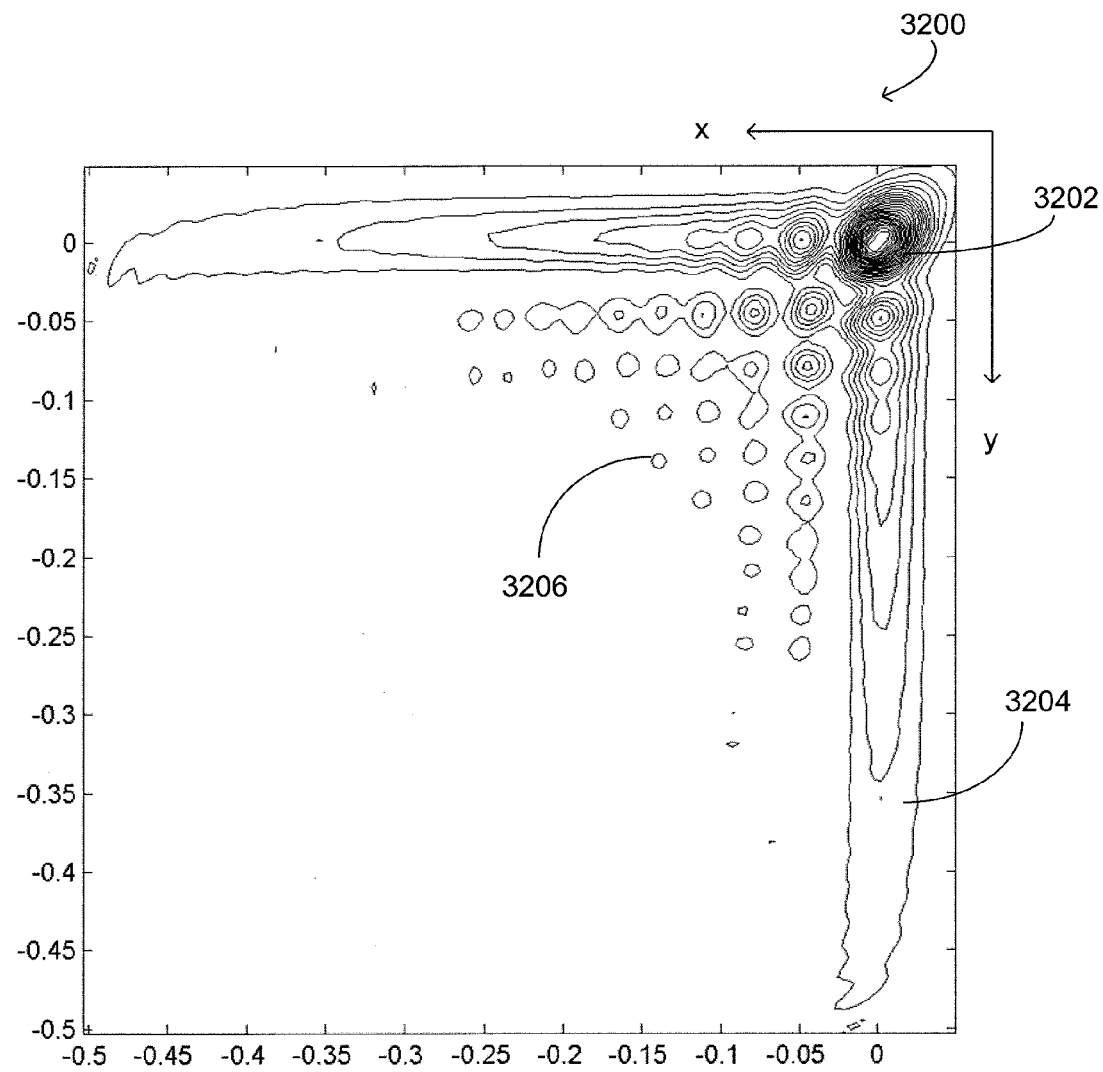
FIG. 32 is a contour plot of the point of FIG. 20, viewed by the optical system with extended depth of field of FIG. 2 or FIG. 3, at defocus of five waves.
Figure 33:
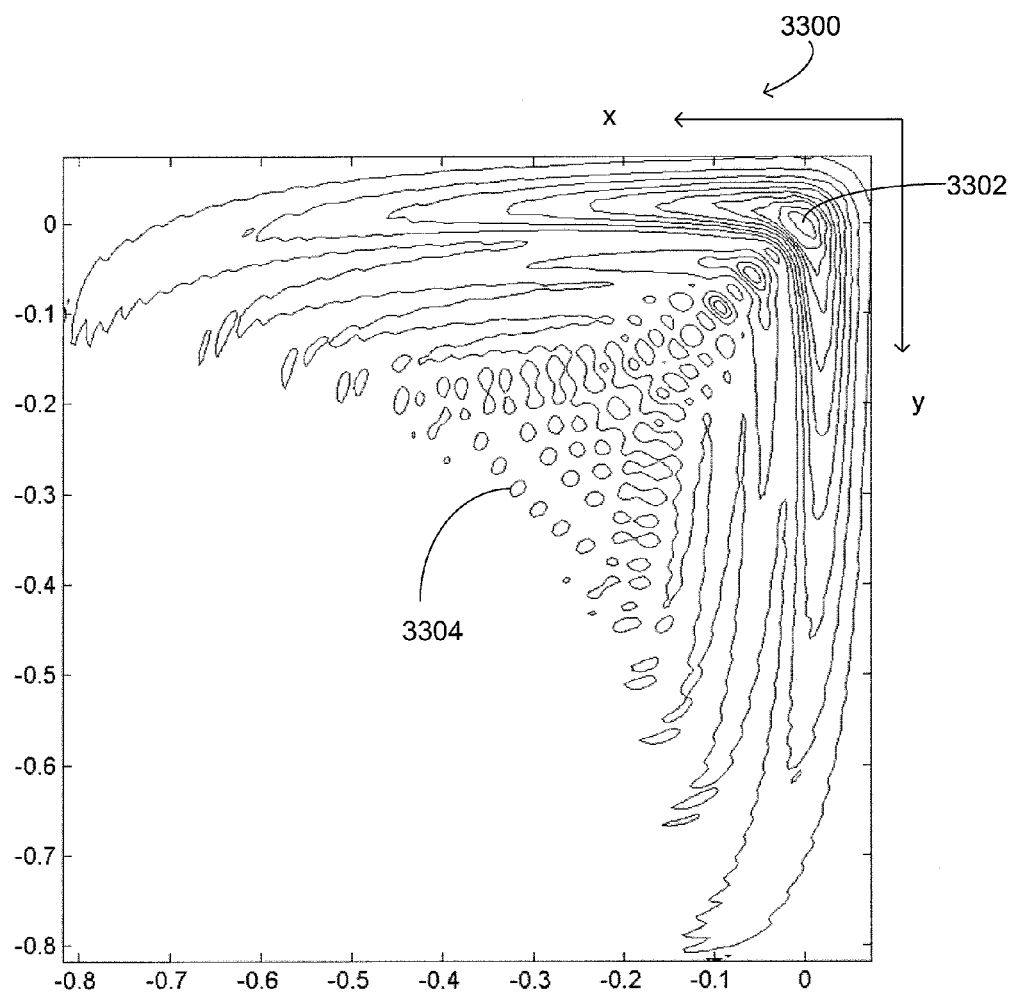
FIG. 33 is a contour plot of the point of FIG. 21, viewed by the optical system with extended depth of field of FIG. 2 or FIG. 3, at defocus of eight waves.

FIGS. 31-33 are simulated contour plots 3100, 3200 and 3300 of gray images 1900, 2000 and 2100, respectively, by optical system 200 or 300. As illustrated in FIG. 31, contour plot 3100 at best focus includes a major peak 3102 that has the largest number of closed loops and is near the intersection of the x axis and the y axis. Contour plot 3100 also includes minor peaks 3104 that have fewer closed loops and are away from the x axis and the y axis, and the intersection of the x axis and the y axis. The darkest spot 1902 of image 1900 corresponds to major peak 3102 of contour plot 3100. The darkest spot 1902 is actually the brightest spot in a real image because of the inverted gray scale in FIG. 19.

Referring to FIG. 32, contour plot 3200 at five waves of defocus includes a major peak 3202 that has the largest number of closed loops near the intersection of the x axis and the y axis. Contour plot 3200 also includes axial peaks 3204 that have elongated loops and are along the x axis and the y axis, and minor peaks 3206 that have a small numbers of closed loops and are away from the x axis and the y axis and the intersection of the x axis and the y axis.

Referring to FIG. 33, contour plot 3300 at eight waves of defocus is similar to contour plot 3100 at best focus and contour plot 3200 at five waves of defocus. Contour plot 3300 includes a major peak 3302 that has the largest number of closed loops near the intersection of the x axis and the y axis. However, minor peaks 3304 of contour plot 3300 have fewer loops and are more spread away from the x axis and the y axis than minor peaks 3104 and 3206 of contour plots 3100 and 3200, respectively. Note that in FIGS. 31-33, each image is normalized with respect to its respective maximum amplitude, and each plot is zoomed around the largest contour levels in order to show detail. Also note that the scale differences among FIGS. 31-33 for system 200 or 300 with extended depth of field are much smaller than the scale difference among FIGS. 28-30 for conventional system 100. The reason for this difference is the larger PSF defocus invariance or extended depth of field provided by imaging systems 200 or 300 with first WFC element 208 or 308.

Figure 34:
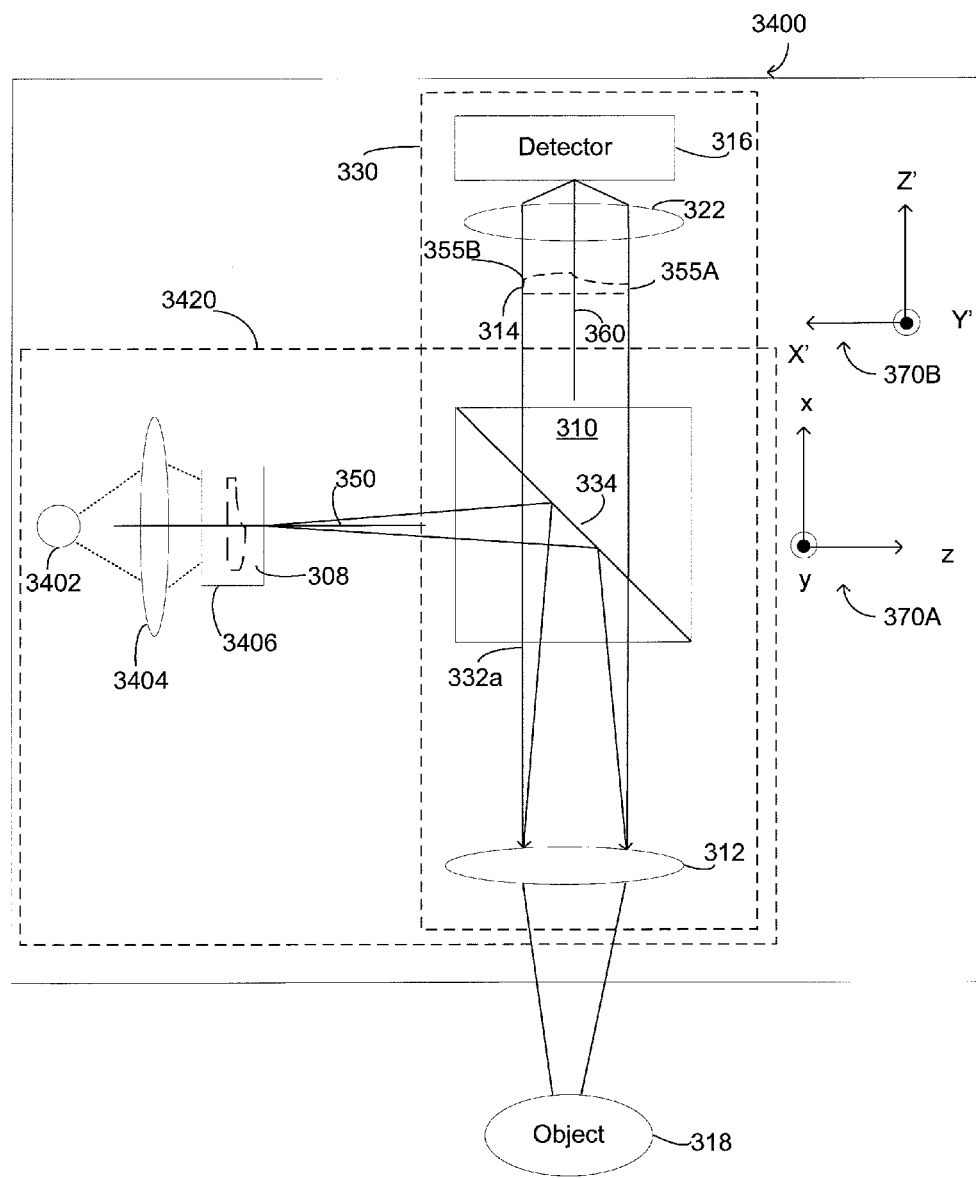
FIG. 34 is a simplified diagram of optical system with extended depth of field in an alternative embodiment.

Additional examples of optical systems with extended depth of field are provided below. FIG. 34 illustrates an alternative embodiment 3400 of optical system 300. System 3400 includes projection arm 3420 and detection arm 330. Projection arm 3420 includes a light source 3402, an optical lens 3404 and a physical medium 3406. Lens 3404 is placed approximately one focal length from light source 3402, condenses light from light source 3402, and provides substantially uniform illumination for physical medium 3406. Projection arm 3420 also includes beam splitter 310 to allow dual use of lens 312, as described for system 300. Physical medium 3406 is placed approximately one focal length from dual purpose lens 312. A calculated computer generated hologram (CGH) is transferred to physical medium 3406. The CGH contains a first computer representation of a grid mask (not shown) and a second computer representation of the Fourier transform of first WFC element 308. The detection arm 330 and other components in system 3400 are the same as for system 300.

Physical medium 3406 may be an optically transparent plastic, such as poly(methyl methacrylate) (PMMA) that is embossed with a transparent pattern that modulates transmitted light with the phase variations determined by the CGH algorithm. PMMA allows creation of a number of CGHs at relatively low cost. An advantage of system 3400 over system 300 is that grid mask 304, lens 306B, and first WFC element 308 of FIG. 3 do not need to be physically present. However, light source 3402 for illuminating embossed physical medium 3406 needs to provide at least partially coherent light. Light source 3402 may be a laser diode to provide a relatively high signal-to-noise ratio and efficiency among light sources. Light source 3402 may also be an LED, to provide satisfactory results at relatively lower cost than a laser diode.

The CGH may be generated by using a computer algorithm. A computer representation of a desired image is first generated by the computer algorithm, including a first computer representation of grid mask 304 and a second computer representation of first WFC element 308. Next, a computer algorithm, such as Beamprop, calculates an optical wavefront at a plane where the CGH is physically located. Typically, a grid projection takes place at a Fourier plane of the CGH. The CGH may be calculated and provided in a form for fabrication of physical medium 3406, for example, in the form of bars of varying heights at various positions, or a surface relief pattern, through using a CGH prescription, such as a Lohmann hologram. An initial CGH may be provided by a Fourier transform of the desired image. Then, an intermediate CGH may be calculated by using the computer algorithm to obtain an error image, which is a difference between the desired image and the intermediate image. By using optimization techniques, such as gradient descent or weight perturbation, the intermediate CGH may be modified until a final CGH obtains a minimal error in the error image. More details about CGH are provided in "Complex Spatial Filtering with Binary Masks" by B. R. Brown and A. W. Lohmann, Applied Optics, Vol. 5, Issue 6, pp. 967-969 (1966).

It will be appreciated by those skilled in the art that optical system 200 or 300 may have various configurations. In a particular embodiment, beam splitter 310 may be movable or removable, such as to reduce loss of light during conventional image capture. Beam splitter 310 is not 100% reflective, and at least some light projected by beam splitter 310 toward object 318 will be lost.

In three-dimensional image capture, a volumetric resolution of an imaging system is limited by the system's ability to distinguish between individual points in object space and accurately determine their position in three-dimensional space. The object space is the physical space around an object. In contrast, image space is the space around the image of the object. For example, in FIG. 3, the object space for projector aim 320 would be around grid mask 304, while the object space for detector arm 330 would be around object 318. Object 318 is in image space for projector arm 320, but in object space for detector arm 330. Detector 316 is in image space for detector arm 330.

Individual points in the object space can be determined by the "center of mass" of the crossing point of grid images, that is, by accurately correlating grid line centroids to their respective grid crossings. The point spread function of projection arm 220 or 320 of system 200 or 300 changes substantially less with defocus than the PSF of projector 102 of conventional system 100. Moreover, first WFC element 208 or 308 provides a significant increase in depth of field with a minimum loss in modulations of intensity. Consequently, the grid line centroids may be more clearly identified after defocus, resulting in a substantial increase in volumetric or spatial resolution, at a much larger DOF. Structural illumination increases volumetric resolution or spatial resolution by collecting information over a larger volume in object space. By increasing the DOF, the volumetric resolution is increased.

Having described several embodiments, it will be recognized by those skilled in the art that various modifications, alternative constructions and equivalents may be used without departing from the spirit of the disclosure. Additionally, a number of well known mathematical derivations and expressions, processes and elements have not been described in order to avoid unnecessarily obscuring the present disclosure. Accordingly, the above description should not be taken as limiting the scope of the disclosure.

It should thus be noted that the matter contained in the above description or shown in the accompanying drawings should be interpreted as illustrative and not in a limiting sense. The following claims are intended to cover generic and specific features described herein, as well as all statements of the scope of the present method and system.

What is claimed is:

1. An optical system for capturing images of a three-dimensional object, the optical system comprising a projector for structured illumination of the object, wherein the projector comprises:
 a light source;
 a grid mask positioned between the light source and the object for structured illumination of the object;
 a first Wavefront Coding (WFC) element having a phase modulating mask positioned between the grid mask and the object to receive patterned light from the light source through the grid mask, wherein the first WFC element is constructed and arranged such that a point spread function of the projector is substantially invariant over a wider range of depth of field of the grid mask than a point spread function of the projector without the first WFC element;
 a detector for detecting the object with structured illumination from the projector; and
 a second WFC element located between the object and the detector such that a first image of the object and a second image of the grid mask on the detector have a larger depth of field than without the second WFC element;
 wherein the second WFC element comprises a circularly symmetric WFC element expressed as $P(\rho)=f(\rho)$, wherein $\rho^2=x^2+y^2$, $\rho$ is a radius of a Fourier plane of the detector, and $f(\rho)$ is a high order polynomial.

2. The optical system of claim 1, wherein the depth of field is at least half of a wave of defocus relative to a center wavelength of the light source.

3. The optical system of claim 1, wherein the first WFC element is configured to concentrate at least 60% of phase modulations along grid lines of the grid mask.

4. The optical system of claim 1, wherein each of the first WFC element and second WFC element comprises a circularly symmetric WFC element.

5. The optical system of claim 1, wherein the second WFC element is configured to be movable or removable.

6. The optical system of claim 1, wherein the grid mask and the first WFC element are part of a single component, the single component comprising a molded plastic.

7. The optical system of claim 1, wherein light from the light source comprises at least one of visible light and infrared light.

8. An optical system for capturing images of a three-dimensional object, the optical system comprising a projector for structured illumination of the object, wherein the projector comprises:
 a light source;
 a grid mask positioned between the light source and the object for structured illumination of the object;
 a first Wavefront Coding (WFC) element having a phase modulating mask positioned between the grid mask and the object to receive patterned light from the light source through the grid mask, wherein the first WFC element is constructed and arranged such that a point spread function of the projector is substantially invariant over a wider range of depth of field of the grid mask than a point spread function of the projector without the first WFC element;

a detector for detecting the object with structured illumination from the projector; and a second WFC element located between the object and the detector such that a first image of the object and a second image of the grid mask on the detector have a larger depth of field than without the second WFC element;

wherein each of the first and second WFC elements comprises a weakly non-separable function is expressed as $$P(x, y) = \sum_{i}^{N} \sum_{j}^{N} \alpha_i x^i + \beta_j y^j + \gamma x^i y^j,$$

the weakly non-separable function for the second WFC element is expressed as $$P(X', Y') = \sum_{i}^{N} \sum_{j}^{N} \alpha_i(-X')^i + \beta_j(-Y')^j + \gamma(-X')^i(-Y')^j,$$

i and j are positive integers, wherein Y' axis is in the same direction as y axis, Z' axis is in the same direction as x axis, and X' axis is in the opposite direction of z axis.

9. An optical system for capturing images of a three-dimensional object, the optical system comprising a projector for structured illumination of the object, wherein the projector comprises:

a light source;

a grid mask positioned between the light source and the object for structured illumination of the object;

a first Wavefront Coding (WFC) element having a phase modulating mask positioned between the grid mask and the object to receive patterned light from the light source through the grid mask, wherein the first WFC element is constructed and arranged such that a point spread function of the projector is substantially invariant over a wider range of depth of field of the grid mask than a point spread function of the projector without the first WFC element;

a detector for detecting the object with structured illumination from the projector; and a second WFC element located between the object and the detector such that a first image of the object and a second image of the grid mask on the detector have a larger depth of field than without the second WFC element;

wherein each of the first and second WFC elements comprises a high order separable function, and wherein the high order separable function for the first WFC element is expressed as $$P(x, y) = \sum_{i}^{N} \sum_{j}^{N} \alpha_i x^i + \beta_j y^j,$$

and the high order separable function for the second WFC element is expressed as $$P(X', Y') = \sum_{i}^{N} \sum_{j}^{N} \alpha_i(-X')^i + \beta_j(-Y')^j,$$

wherein Y' axis is in the same direction as y axis, Z' axis is in the same direction as x axis, and X' axis is in the opposite direction of z axis.

10. An optical system for capturing images of a three-dimensional object, the optical system comprising a projector for structured illumination of the object, wherein the projector cormprises:

a light source;

a grid mask positioned between the light source and the object for structured illumination of the object;

a first Wavefront Coding (WFC) element having a phase modulating mask positioned between the grid mask and the object to receive patterned light from the light source through the grid mask, wherein the first WFC element is constructed and arranged such that a point spread function of the projector is substantially invariant over a wider range of depth of field of the grid mask than a point spread function of the projector without the first WFC element;

a detector for detecting the object with structured illumination from the projector; and, a second WFC element located between the object and the detector such that a first image of the object and a second image of the grid mask on the detector have a larger depth of field than without the second WFC element;

wherein each of the first and second WFC elements comprises a cubic function, and wherein the cubic function for the first WFC element is expressed as $\alpha x^3 + \beta y^3$, and the cubic function for the second WFC element is expressed as $-(\alpha X'^3 + \beta Y'^3)$, wherein Y' axis is in the same direction as y axis, Z' axis is in the same direction as x axis, and X' axis is in the opposite direction of z axis.

* * * * *

UNITED STATES PATENT AND TRADEMARK OFFICE
CERTIFICATE OF CORRECTION

PATENT NO. : 8,633,969 B2  Page 1 of 1
APPLICATION NO. : 13/024221
DATED : January 21, 2014
INVENTOR(S) : Paulo E. X. Silveira et al.

It is certified that error appears in the above-identified patent and that said Letters Patent is hereby corrected as shown below:

In the Specification
Column 8, Line 49, "$P(x,y)=-\alpha X^3+\beta Y^3)$" should read --$P(x,y)=-(\alpha X^3+\beta Y^3)$--.
Column 10, Line 55, "teen" should read --term--.
Column 13, Line 45, "aim" should read --arm--.

In the Claims
Column 15, Line 13, "function is expressed" should read --function expressed--.

Signed and Sealed this
Twenty-eighth Day of October, 2014

Michelle K. Lee
*Deputy Director of the United States Patent and Trademark Office*